United States Patent
Senoo et al.

(10) Patent No.: US 7,460,457 B2
(45) Date of Patent: Dec. 2, 2008

(54) OPTICAL DISK RECORDING/PLAYBACK APPARATUS AND OPTICAL DISK EVALUATION METHOD USING A TEMPORARY MEMORY

(75) Inventors: Hidemitsu Senoo, Gifu (JP); Tomonori Kamiya, Aichi (JP); Yuichiro Tsukamizu, Aichi (JP)

(73) Assignee: Sanyo Electric Co., Ltd., Osaka (JP)

( * ) Notice: Subject to any disclaimer, the term of this patent is extended or adjusted under 35 U.S.C. 154(b) by 690 days.

(21) Appl. No.: 11/073,941

(22) Filed: Mar. 8, 2005

(65) Prior Publication Data

US 2005/0201239 A1    Sep. 15, 2005

(30) Foreign Application Priority Data

Mar. 9, 2004  (JP) ............................... 2004-065981
Jun. 8, 2004  (JP) ............................... 2004-170001

(51) Int. Cl.
*G11B 11/00* (2006.01)

(52) U.S. Cl. .................................. 369/53.34; 369/47.28

(58) Field of Classification Search ............... 369/44.32, 369/53.35

See application file for complete search history.

(56) References Cited

U.S. PATENT DOCUMENTS

| | | | | | |
|---|---|---|---|---|---|
| 5,185,765 | A | * | 2/1993 | Walker | 375/238 |
| 5,590,112 | A | * | 12/1996 | Morishima | 369/47.29 |
| 6,552,971 | B2 | * | 4/2003 | Iida | 369/44.29 |
| 6,778,104 | B2 | * | 8/2004 | Chen et al. | 341/59 |
| 6,956,805 | B2 | * | 10/2005 | Mashimo | 369/59.17 |
| 7,304,932 | B2 | * | 12/2007 | Sako et al. | 369/59.24 |

FOREIGN PATENT DOCUMENTS

JP        11-167720        6/1999

* cited by examiner

*Primary Examiner*—Paul Huber
(74) *Attorney, Agent, or Firm*—Fish & Richardson P.C.

(57) ABSTRACT

A counter 11 continuously reads in the EFM signal from a binarizing circuit 4, resets its count value each time the polarity of the EFM signal changes, counts counter clocks higher in frequency than the EFM signal during each EFM period of the EFM signal, and transfers the count values to a FIFO 12 sequentially. The FIFO 12 temporarily stores the count values transferred, and writes a predetermined number of count values into a buffer RAM 7 in a batch each time the predetermined number of count values are stored.

13 Claims, 22 Drawing Sheets

FIG.6

| BUFFER RAM ADDRESS | COUNT VALUE | HIGH/LOW | ERROR |
|---|---|---|---|
| 1 | 803 | 0 | 0 |
| 2 | 916 | 1 | 0 |
| 3 | 1037 | 0 | 0 |
| 4 | 15 | 1 | 1 |
| 5 | 1269 | 0 | 0 |
| 6 | 456 | 1 | 0 |
| ⋮ | ⋮ | ⋮ | ⋮ |

OPTICAL DISK RECORDING/PLAYBACK APPARATUS AND OPTICAL DISK EVALUATION METHOD USING A TEMPORARY MEMORY

CROSS-REFERENCE TO RELATED APPLICATIONS

The present application claims priority upon Japanese Patent Applications Nos. 2004-65981 and 2004-170001 filed on Mar. 9, 2004 and Jun. 8, 2004 respectively, which are herein incorporated by reference.

BACKGROUND OF THE INVENTION

1. Field of the Invention

The present invention relates to an optical disk recording/playback apparatus and optical disk evaluation method that illuminates an optical disk with laser light, receives the laser light modified by pits or marks recorded on the optical disk, and converts the light amount of the received laser light into an electrical signal, thereby obtains a playback signal to evaluate the optical disk.

2. Description of the Related Art

To date, an evaluation apparatus called a jitter meter has been used as an evaluation apparatus for optical disks. See for example Japanese Patent Laid-open Publication No. 11-167720. This evaluation apparatus quantitatively measures temporal variation called jitter in the playback signal of an optical disk. The dedicated jitter meter is expensive, and jitter cannot have been evaluated readily and inexpensively. Accordingly, a method of evaluating jitter by using an optical disk recording/playback apparatus has been come up with.

FIG. 20 shows a CD recording/playback apparatus 100 as an optical disk recording/playback apparatus having a function of evaluating optical disks. The operation of playing back an optical disk 2 by this CD recording/playback apparatus 100 will be described.

A pickup 1 receives reflected light from optical disk 2 illuminated with light and converts a high/low intensity of the reflected light into a high/low level of voltage. A pickup controller 3 controls the reading position of pickup 1 relative to optical disk 2 such that pickup 1 can read out, in correct order, data represented by pits or marks recorded on optical disk 2. A binarizing circuit 4 reads changes in voltage output from the pickup 1 and produces an EFM (Eight to Fourteen Modulation) signal having one frame of 588 bits as a unit. This EFM signal has a repetitive pattern of High and Low levels. The time periods of these High and Low levels vary between 3T and 1T, nine different time periods, where T is the time period of 1 bit that is about 230 ns.

A digital signal processing circuit 5 performs EFM demodulation on the EFM signal output from the binarizing circuit 4, and performs CIRC (Cross-Inter leave Reed-Solomon Code) decoding on the demodulated EFM signal to produce CD-ROM data having frames of 24 bytes. A CD-ROM decoder 6 detects for read errors in the CD-ROM data inputted from the digital signal processing circuit 5, corrects the errors, and outputs the corrected CD-ROM data to a host computer.

A buffer RAM 7 is connected to the CD-ROM decoder 6, and temporarily stores CD-ROM data inputted from the digital signal processing circuit 5 to the CD-ROM decoder 6, on a block unit basis. Because error correction is performed on one block of data, the process in the CD-ROM decoder 6 needs at least one block of CD-ROM data. CD-ROM data is sequentially read out, and one block of CD-ROM data necessary for each process execution is stored in the buffer RAM 7. The buffer RAM 7 is a DRAM in order to store a large amount of data. A control microcomputer 8 is constituted by a so-called one-chip microcomputer having a ROM and a RAM incorporated, controls the operation of the CD-ROM decoder 6 according to a control program recorded in the ROM, and at the same time, temporarily stores command data input from the host computer and sub-code data input from the digital signal processing circuit 5 in the incorporated RAM. Thus, the control microcomputer 8 controls the operation of each component in response to instructions from the host computer, to make the CD-ROM decoder 6 output desired CD-ROM data to the host computer.

Next, a method of evaluating jitter of optical disk 2 in CD recording/playback apparatus 100 will be described.

The pickup 1, optical disk 2, pickup controller 3, and binarizing circuit 4 are controlled by the control microcomputer 8 to operate in the same way as in the playback operation for optical disk 2, but the digital signal processing circuit 5 and CD-ROM decoder 6 are controlled by the control microcomputer 8 not to operate, and the buffer RAM 7 operates in a different way as in the playback operation.

A counter 10 is connected to the binarizing circuit 4, and reads in the EFM signal output from the binarizing circuit 4. The counter 10 counts counter clocks of higher frequency than that of the input EFM signal from each change point of the polarity of the EFM signal to the next change point (i.e., counts each time period indicating "High" or "Low" level), and writes the count values sequentially into the buffer RAM 7. For a CLV operation of constant linear velocity at single speed, the 1T of the EFM signal is about 230 ns, and hence, if counter clocks having a clock period of 2 ns, higher in frequency, are used in counting, the count value for clock period 3T of the EFM signal that is about 690 ns (about 230 ns×3) is 345 ideally. Likewise, the count value for clock period 4T of the EFM signal is 460, the count value for clock period 5T is 575, . . . , the count value for clock period 11T is 1265. After performing this operation on a given area of data recorded on the optical disk 2, the control microcomputer 8 evaluates jitter by analyzing the count values stored in the buffer RAM 7.

Here, the count values, measured data, are written on a word (16 bits) unit basis from the counter 10 into the buffer RAM 7 constituted by a DRAM as shown in FIG. 21. The counter 10 writes one count value as measured data by outputting five commands, ACT (active), NOP (no operation), WRIT (write; input=DATA1), PRE (pre-charge), and NOP (no operation), with respect to the basic clock to the buffer RAM 7. That is, it takes 5 cycles of the basic clock to write one count value as measured data.

The writing of measured data in the CD recording/playback apparatus 100 will be described in detail using FIG. 22. The counter 10 continuously reads in the EFM signal from the binarizing circuit 4, resets its count value each time the polarity of the EFM signal changes from High to Low or from Low to High, and counts counter clocks higher in frequency than the EFM signal during each EFM clock period of the EFM signal. Then, the next time when the polarity of the EFM signal changes from Low to High or from High to Low, the counter 10 stores the count value up to here in a register of the counter 10 and resets its count value. Then, while counting during the next EFM clock period, the counter 10 writes the count value for the preceding EFM clock period stored in the register into the buffer RAM 7. A memory management circuit incorporated in the counter 10 dedicatedly performs the writing into the buffer RAM 7 and outputs commands to write into buffer RAM 7. In this way, the counter 10 counts during the current EFM clock period, while writing the count value for the preceding EFM clock period into the buffer RAM 7. It takes 5 cycles of the basic clock, time period T1, for the counter 10 to write the count value for the preceding EFM clock period as measured data into the buffer RAM 7.

The counter 10 first resets its count value when the polarity of the EFM signal changes. The next time when the polarity of the EFM signal changes, the counter 10 stores the count value N1 in the register and resets its count value.

Then, while counting counter clocks during the second EFM clock period, the counter 10 writes the count value N1 stored in the register into the buffer RAM 7 in the time period T1. The next time when the polarity of the EFM signal changes, the counter 10 stores the count value N2 in the register and resets its count value. Then, while counting counter clocks during the third EFM clock period, the counter 10 writes the count value N2 stored in the register into the buffer RAM 7 in the time period T1. By repeating this operation, the counter 10 writes sequentially the count values for EFM clock periods into the buffer RAM 7.

However, in the conventional art, it takes the predetermined time period T1 to write the count value for the preceding EFM clock period into the buffer RAM 7, and if the polarity of the EFM signal changes during that time period, lack of the count value may occur in the measured data that the counter 10 writes into the buffer RAM 7. In an example shown in FIG. 22, while the counter 10 is writing the count value N3 for the third EFM clock period into the buffer RAM 7, the polarity of the EFM signal changes. Thus, measured data of the count value N4 is not written into the buffer RAM 7, and thus, the problem occurs that jitter cannot be accurately evaluated.

SUMMARY OF THE INVENTION

In view of the above problem of the conventional art, an object of the present invention is to provide an optical disk recording/playback apparatus and optical disk evaluation method that eliminates lack of a count value in the measured data for the EFM clock periods, thus being able to evaluate jitter accurately.

According to the present invention, there is provided an optical disk recording/playback apparatus which illuminates an optical disk with laser light, receives the laser light modulated by pits or marks recorded on the optical disk, and converts the light amount of the received laser light into an electrical signal, thereby obtaining a reproduced signal and evaluating the optical disk, comprising a binarizing circuit that produces a series of binary values from the reproduced signal; a counter that counts counter clocks of high frequency during periods of the series of binary values produced from the reproduced signal by the binarizing circuit; and a temporary memory that temporarily stores a plurality of count values of the counter and transfers the plurality of count values stored to a measured data store area of a buffer RAM in a batch.

The present invention can eliminate lack of a count value in the measured data for the EFM clock periods and thus can evaluate jitter accurately.

Features and objects of the present invention other than the above will become clear by reading the description of the present specification with reference to the accompanying drawings.

BRIEF DESCRIPTION OF THE DRAWINGS

For a more complete understanding of the present invention and the advantages thereof, reference is now made to the following description taken in conjunction with the accompanying drawings wherein:

FIG. 6 shows measured data written in the buffer RAM according to the first embodiment of the present invention;

DETAILED DESCRIPTION OF THE INVENTION

At least the following matters will be made clear by the explanation in the present specification and the description of the accompanying drawings.

First Embodiment

<Configuration>

Figure 1:
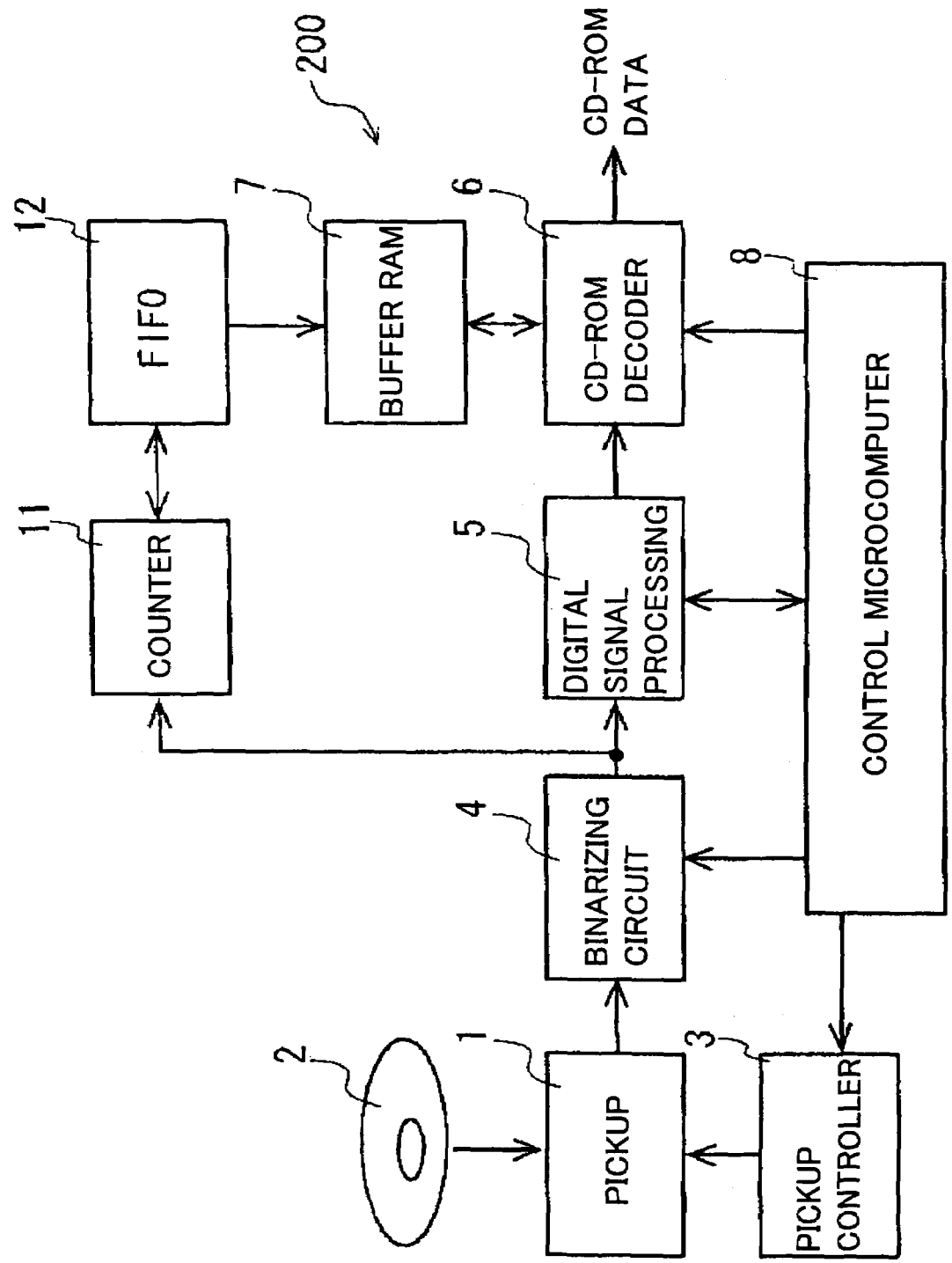
FIG. 1 is a block diagram showing a first embodiment of an optical disk recording/playback apparatus according to the present invention.
Figure 20:
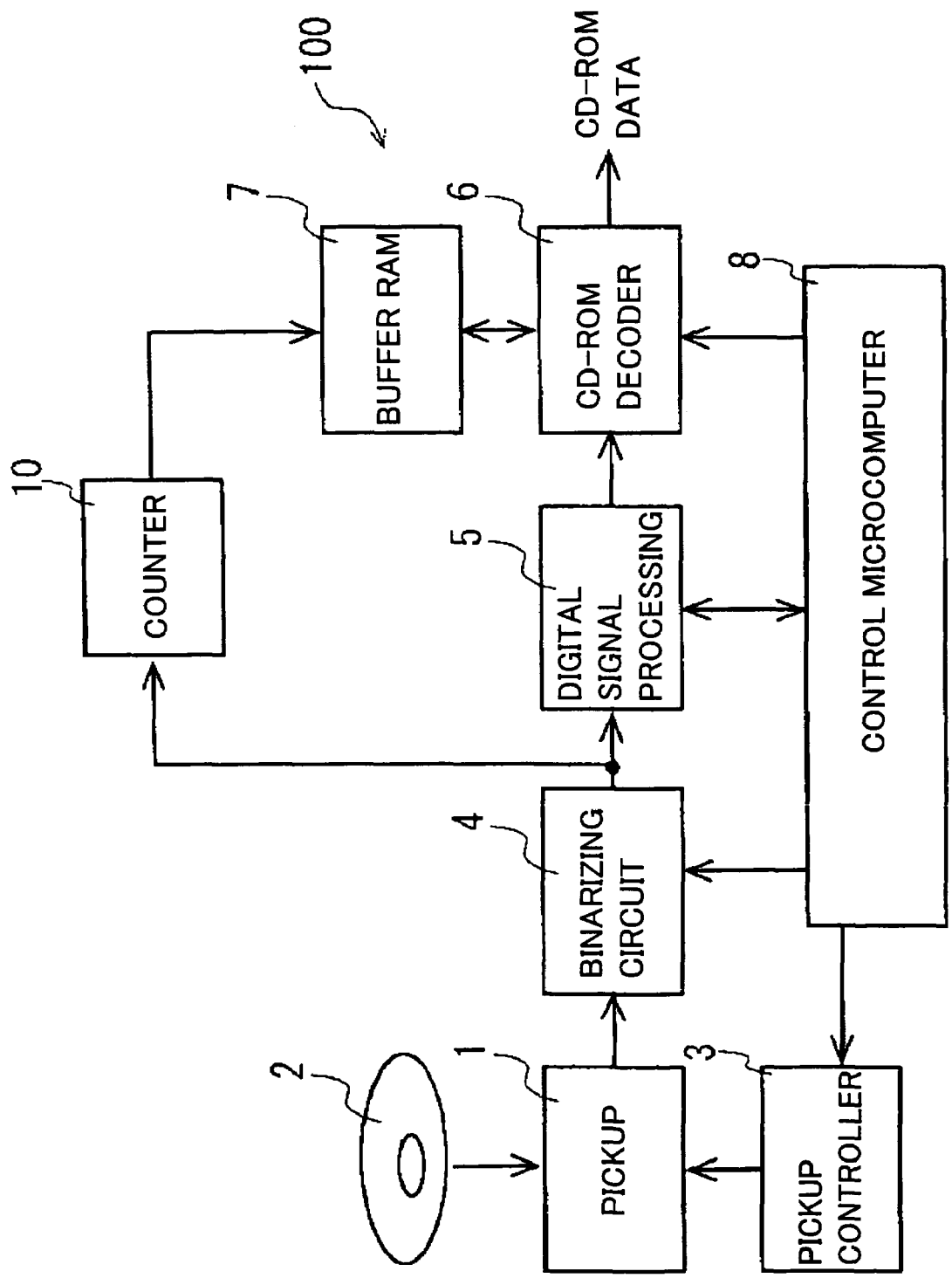
FIG. 20 is a block diagram of a conventional optical disk recording/playback apparatus.
Figure 21:
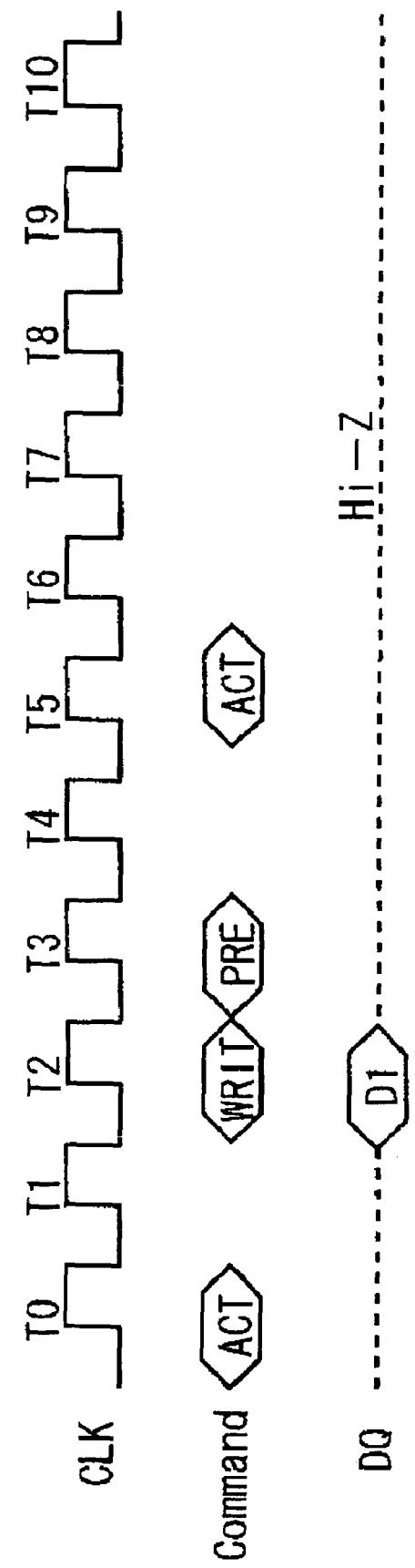
FIG. 21 is a view for explaining the operation of writing into a buffer RAM in the conventional optical disk recording/playback apparatus.
Figure 22:
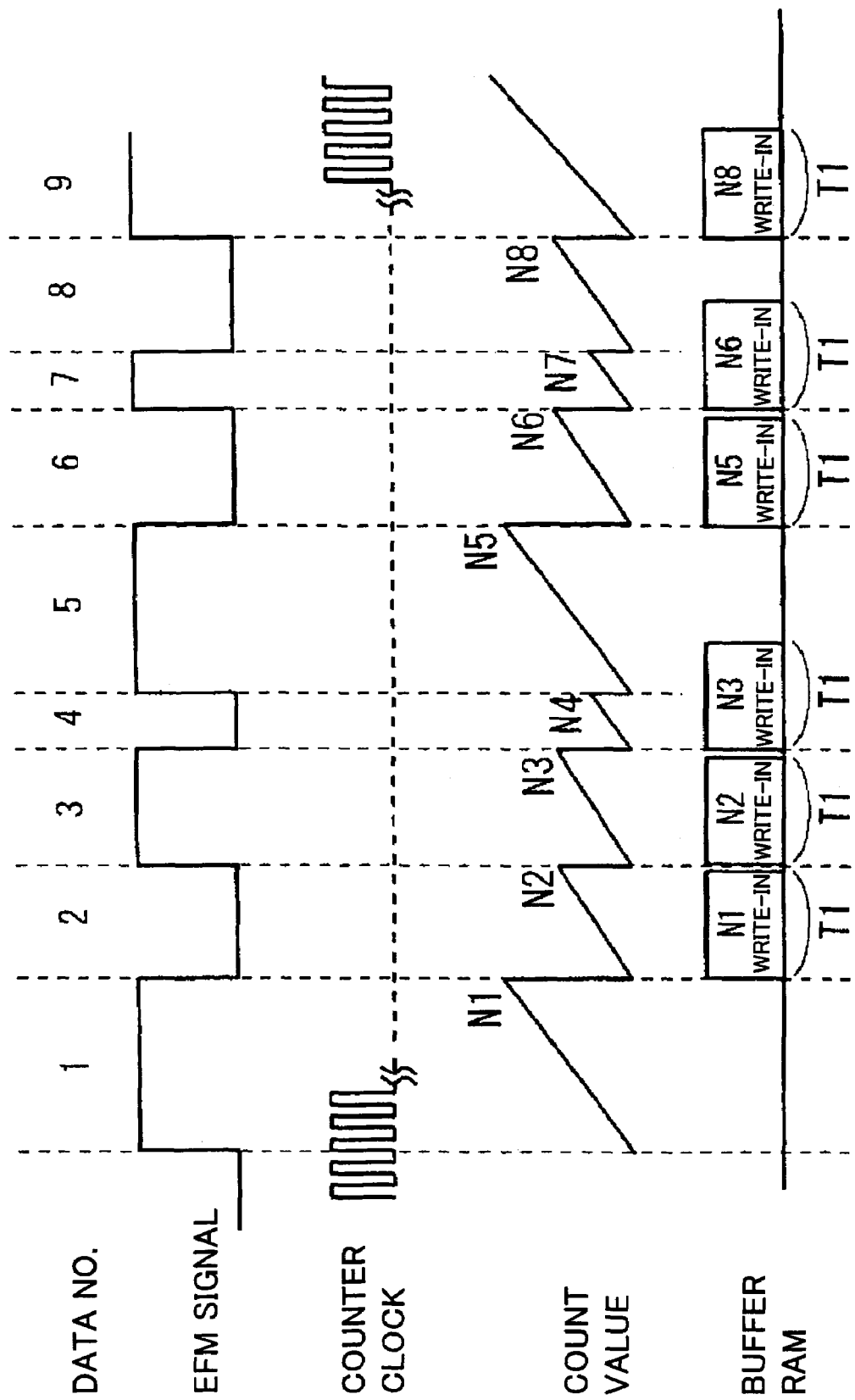
FIG. 22 is a view for explaining writing in measured data in the conventional optical disk recording/playback apparatus.

A CD recording/playback apparatus 200 as an optical disk recording and/or playback apparatus (hereinafter, referred to as an optical disk recording/playback apparatus) according to a first embodiment of the present invention is configured as shown in FIG. 1. In the present embodiment, the circuits that have the same functions as in the conventional art of FIG. 20 are denoted by the same reference numerals, and a description thereof is omitted.

In the CD recording/playback apparatus 200, a counter 11 is connected to the binarizing circuit 4, and reads in the EFM signal output from the binarizing circuit 4. And the counter 11 counts counter clocks higher in frequency than the input EFM signal during each EFM clock period (each time period indicating "High" or "Low" level) of the EFM signal, and transfers the count value to a FIFO 12 that is a temporary memory for temporary storage. FIFO 12 comprises registers and the like, and does not take much time to transfer measured data like the buffer RAM 7 constituted by a DRAM does. FIFO 12 comprises two register groups, first and second register groups, which each can store four count values temporarily. Hence, while temporarily storing the count values for four EFM clock periods input from the counter 11 in one register group, FIFO 12 writes the four count values stored in the other register group into the buffer RAM 7 in a batch. After performing this operation on a given time period of data recorded on the optical disk 2, the control microcomputer 8 evaluates jitter by analyzing the count values stored in the buffer RAM 7.

<Writing in of Measured Data>

<<Normal Mode>>

Figure 2:
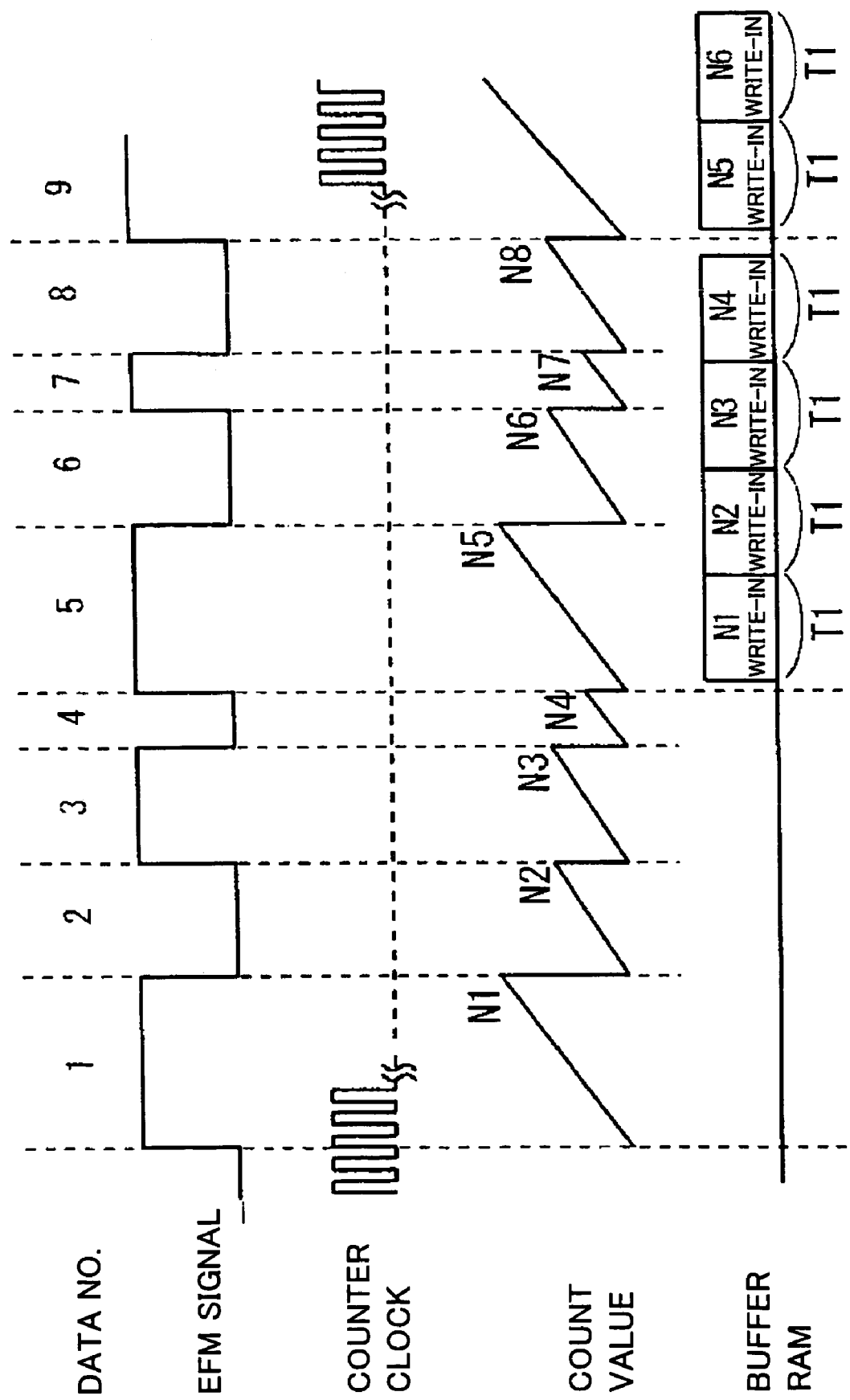
FIG. 2 is a view for explaining writing measured data in according to the first embodiment of the present invention.

Writing in of measured data in the CD recording/playback apparatus 200 will be described in more detail using FIG. 2. The counter 11 reads in the EFM signal output from the binarizing circuit 4. And each time the polarity of the EFM signal changes from High to Low or from Low to High, the counter 11 resets its count value and counts counter clocks higher in frequency than the input EFM signal during each EFM clock period of the EFM signal. Then, the next time when the polarity of the EFM signal changes from Low to High or from High to Low, the counter 11 stores the count value up to here in a register of the counter 11 and resets its count value. Then, while counting during the next EFM clock period, the counter 11 transfers the count value for the preceding EFM clock period stored in the register to the FIFO 12. In this way, the counter 11 transfers the count values sequentially to the FIFO 12.

The FIFO 12 sequentially stores count values being transferred from the counter 11 in the first register group, and when four count values are stored in the first register group, FIFO 12 writes the four count values as measured data into the buffer RAM 7 in a batch. While writing the four count values stored in the first register group into the buffer RAM 7 in a batch, the FIFO 12 temporarily stores count values being transferred from the counter 11 in the second register group. When four count values are stored in the second register group, the FIFO 12 writes the four count values as measured data into the buffer RAM 7 in a batch, during which count values being transferred from the counter 11 are stored in the first register group.

A memory management circuit incorporated in the FIFO 12 dedicatedly performs the writing of measured data into the buffer RAM 7 and outputs commands to write into the buffer RAM 7. In this way, the counter 11 counts counter clocks during each EFM clock period, and transfers the count value to the FIFO 12. The FIFO 12 temporarily stores each count value transferred, and each time four count values are stored, the four count values are written into buffer RAM 7 in a batch.

The counter 11 first resets its count value when the polarity of the EFM signal changes, and counts counter clocks during the first EFM clock period. The next time when the polarity of the EFM signal changes, the counter 11 stores the count value N1 in the register and resets its count value. Then, while counting counter clocks during the second EFM clock period, the counter 11 transfers the count value N1 stored in the register to the FIFO 12. When the FIFO 12 has received the count value N1, the memory management circuit of the FIFO 12 sends back a signal acknowledging receipt of the measured data to the counter 11.

The next time when the polarity of the EFM signal changes, the counter 11 stores the count value N2 in the register and resets its count value. Then, while counting counter clocks during the third EFM clock period, the counter 11 transfers the count value N2 stored in the register to the FIFO 12. When the FIFO 12 has received the count value N2, the memory management circuit sends back a signal acknowledging receipt of the measured data to the counter 11. This operation is repeated, and while counting counter clocks during the fifth EFM clock period, the counter 11 transfers the count value N4 stored in the register to the FIFO 12. When the FIFO 12 has received the count value N4, the memory management circuit sends back a signal acknowledging receipt of the measured data to the counter 11. Because the FIFO 12 is full with four count values stored, the FIFO 12 writes the four count values temporarily stored into the buffer RAM 7 in a batch.

Even when a short EFM clock period is included in the EFM clock periods during which the counter 11 counts while the FIFO 12 is writing the four count values temporarily stored into the buffer RAM 7 in a batch, if the sum of four EFM clock periods to count is long enough, all measured data of the four count values can be written into the buffer RAM 7. For example, in FIG. 2, the seventh EFM clock period is shorter than the time that it takes to write one measured data into the buffer RAM 7, but since the sum of the fifth to eighth EFM clock periods is longer than the time that it takes to write count values N1 to N4 into the buffer RAM 7, all measured data of the four count values can be written into the buffer RAM 7.

<<Burst Mode>>

Figure 3:
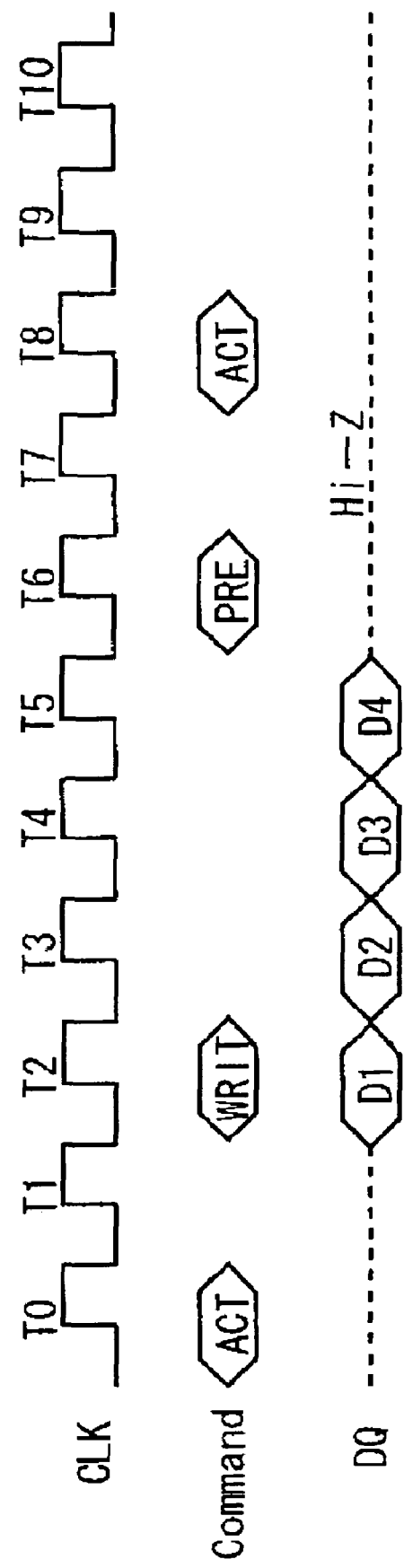
FIG. 3 is a view for explaining the operation of writing into a buffer RAM according to the first embodiment of the present invention.

The writing of measured data from the FIFO 12 into the buffer RAM 7 can be sped up by using a burst mode as shown in FIG. 3. The burst mode is a write mode to write a plurality of data into a synchronous DRAM or the like in a batch. The FIFO 12 writes four count values as measured data in a batch by outputting eight commands, ACT (active), NOP (no operation), WRIT (write; input=DATA1), NOP (no operation; input=DATA2), NOP (no operation; input=DATA3), NOP (no operation; input=DATA4), PRE (pre-charge), and NOP (no operation), with respect to the basic clock to the buffer RAM 7. That is, it takes only 8 cycles of the basic clock, time period T2, to write four count values.

Figure 4:
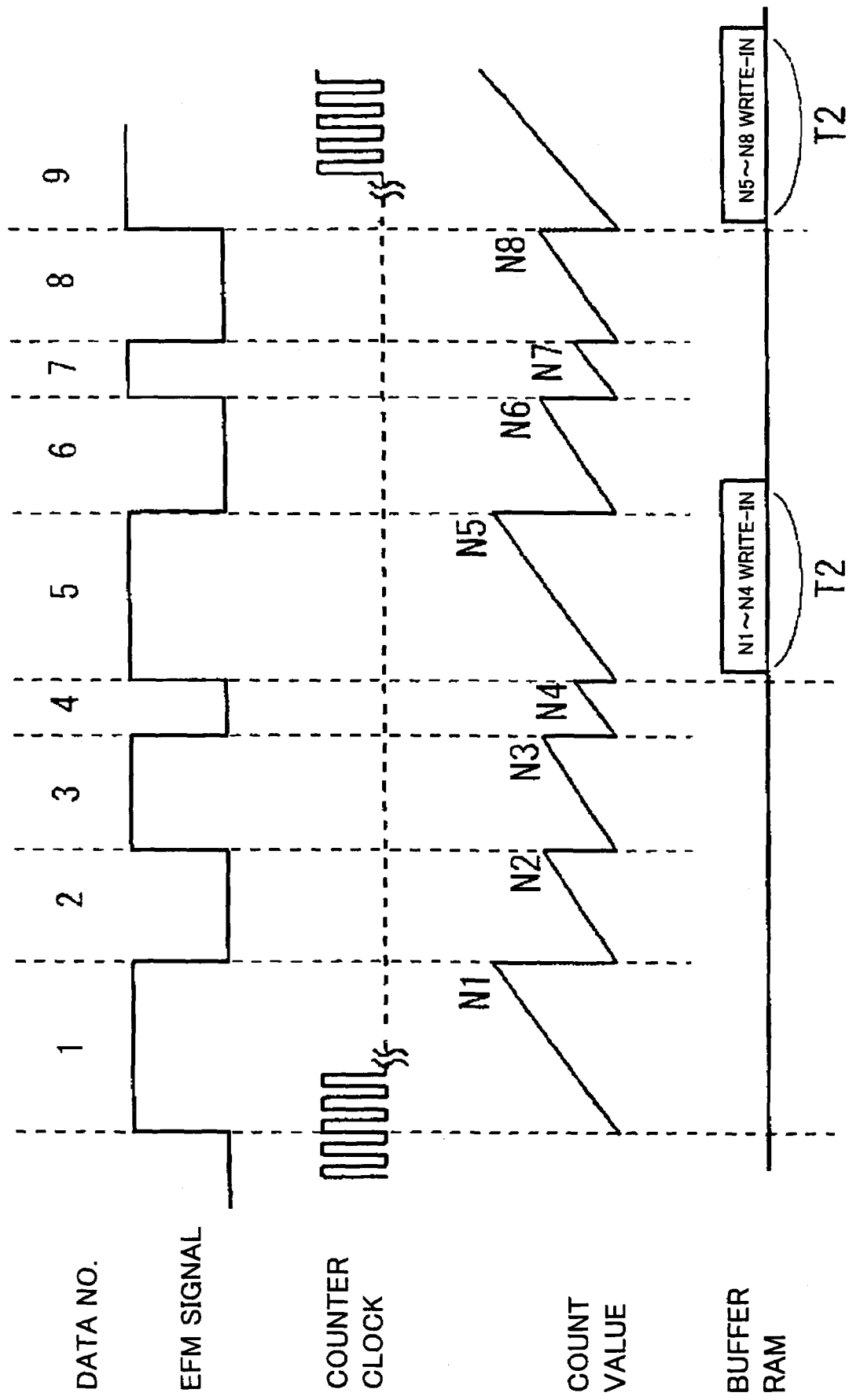
FIG. 4 is a view for explaining writing measured data in according to the first embodiment of the present invention.

In the case where measured data is written into the buffer RAM 7 using the burst mode of FIG. 3, in the CD recording/playback apparatus 200, measured data is written as shown in FIG. 4. Because the time period T2 is shorter than the sum of four time period T1, the FIFO 12 can write count values into the buffer RAM 7 with time to spare.

Furthermore, instead of the burst mode shown in FIG. 3, other write methods or modes for efficiently writing a plurality of measured data into the buffer RAM 7 in a short time may be used.

<<Specific Example>>

Figure 5:
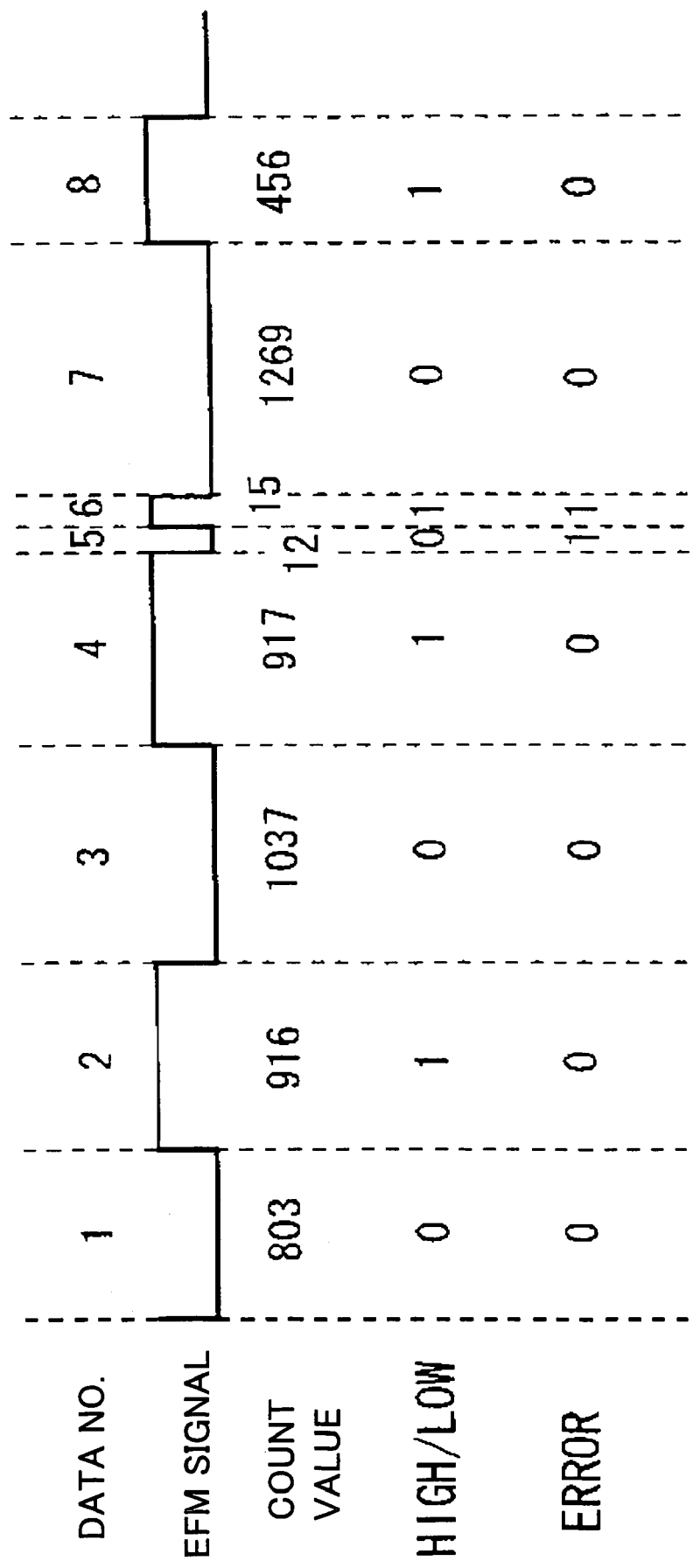
FIG. 5 shows an example of measured data according to the first embodiment of the present invention.

Next, the writing in of measured data according to the present embodiment will be described specifically. FIG. 5 shows an example of measured data. The counter 11 counts during each EFM clock period to obtain a count value, and at the same time determines whether each EFM clock period is at a High level or a Low level. Further, the counter 11 determines whether the transfer of measured data to the FIFO 12 is normally finished, and if there has been an anomaly, outputs an error signal to the FIFO 12. Measured data to be transferred to the FIFO 12 has a total of 16 bits of information: a count value of 14 bits, polarity data of one bit indicating the High/Low level, and a bit indicating error/no-error. For first measured data, the data is 7T since the count value is 803 (the ideal count value for 7T=805), and for second measured data, the data is 8T since the count value is 916 (the ideal count value for 8T=920). When in an EFM clock period the level is Low, the polarity data is 0, and when in an EFM clock period the level is High, the polarity data is 1. And for normal measured data, the error signal is at 0, and for anomalous measured data, the error signal is at 1.

In FIG. 5, measured data for the first through third EFM clock periods are normally transferred from the counter 11 to the FIFO 12, but the fifth and sixth EFM clock periods are extraordinarily shorter than 1T (the ideal count value for 1T=115) due to a defect in the formation of the pit or noise in playback. Hence, the fourth and fifth measured data, which should be transferred while the counter 11 counts during the fifth and sixth EFM clock periods, cannot be normally transferred to the FIFO 12. That is, the FIFO 12 cannot receive the fourth and fifth measured data, and does not output a signal acknowledging receipt of the measured data to the counter 11 in reply. Since not receiving a signal acknowledging receipt of the fourth measured data from the FIFO 12, the counter 11 transfers the fifth measured data to the FIFO 12 with rendering the error signal at 1. Likewise, since not receiving a signal acknowledging receipt of the fifth measured data from the FIFO 12, the counter 11 transfers the sixth measured data to the FIFO 12 with rendering the error signal at 1.

In this way, the measured data for the fourth and fifth EFM clock periods cannot be normally transferred to the FIFO 12, and are missing, so that measured data written in the buffer RAM is as shown in FIG. 6. In FIG. 6, in order to facilitate understanding, 16 bits of information written in an address of the buffer RAM 7 is shown divided into a count value, the polarity data of one bit indicating the High/Low level, and the error signal. Although the measured data for the first through third and sixth and later EFM clock periods are written in the buffer RAM 7, the fourth measured data has the error signal being at 1. It is presumed that there is missing measured data immediately before measured data having the error signal being at 1, and hence, by excluding the missing measured data, the measured data having the error signal being at 1, and measured data around it from the evaluation of jitter, the highly reliable evaluation of jitter can be performed. In the example of FIG. 6, by excluding measured data in the addresses 3 through 5 of the buffer RAM 7 from data to be evaluated, the more highly reliable, accurate evaluation of jitter can be performed.

In the present embodiment, the number of count values that the FIFO 12 can store is four, but not being limited to four, need only be greater than one.

<Evaluation of Jitter>

Figure 7:
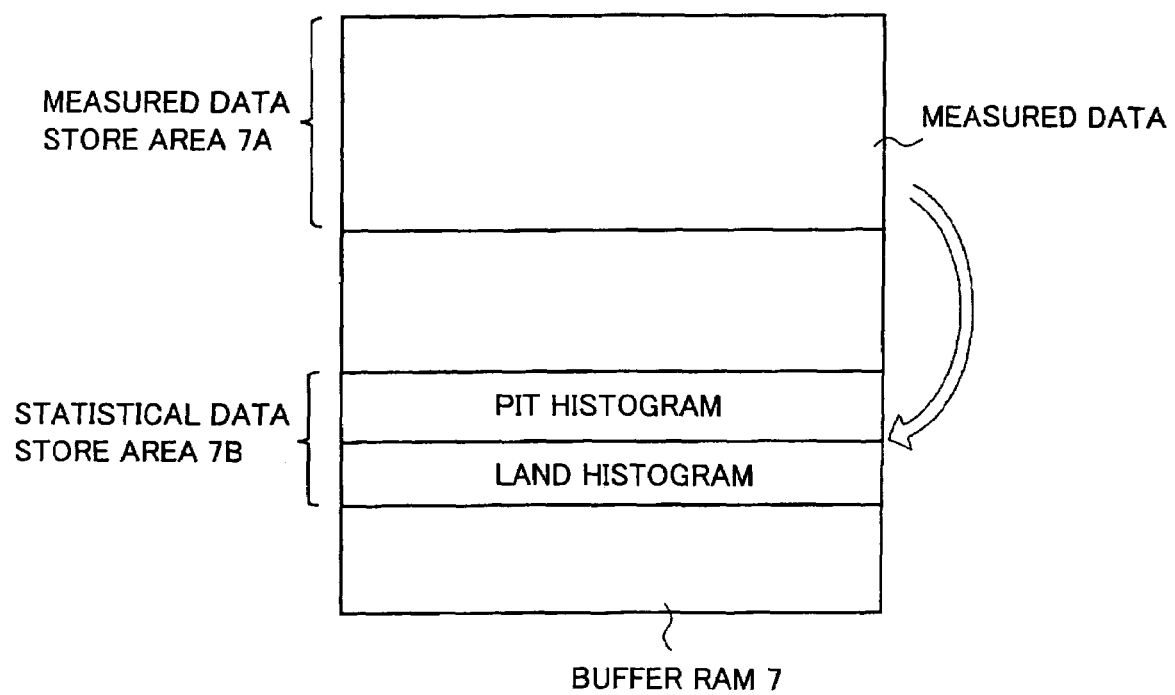
FIG. 7 is a view for explaining data store areas in the buffer RAM according to the first embodiment of the present invention.

In this way, the measured data for EFM clock periods are written in a measured data store area 7a of the buffer RAM 7 as shown in FIG. 7. The measured data store area 7a is part of the memory area of the buffer RAM 7. After finishing the writing of measured data into the buffer RAM 7, the control microcomputer 8 reads out the measured data from the buffer RAM 7 and performs various statistical operations thereon, and then, temporarily stores intermediate results of the statistical operations in a statistical data store area 7b of the buffer RAM 7 separate from the measured data store area 7a updating data stored in the statistical data store area 7b upon each progression of the statistical operations.

Figure 8:
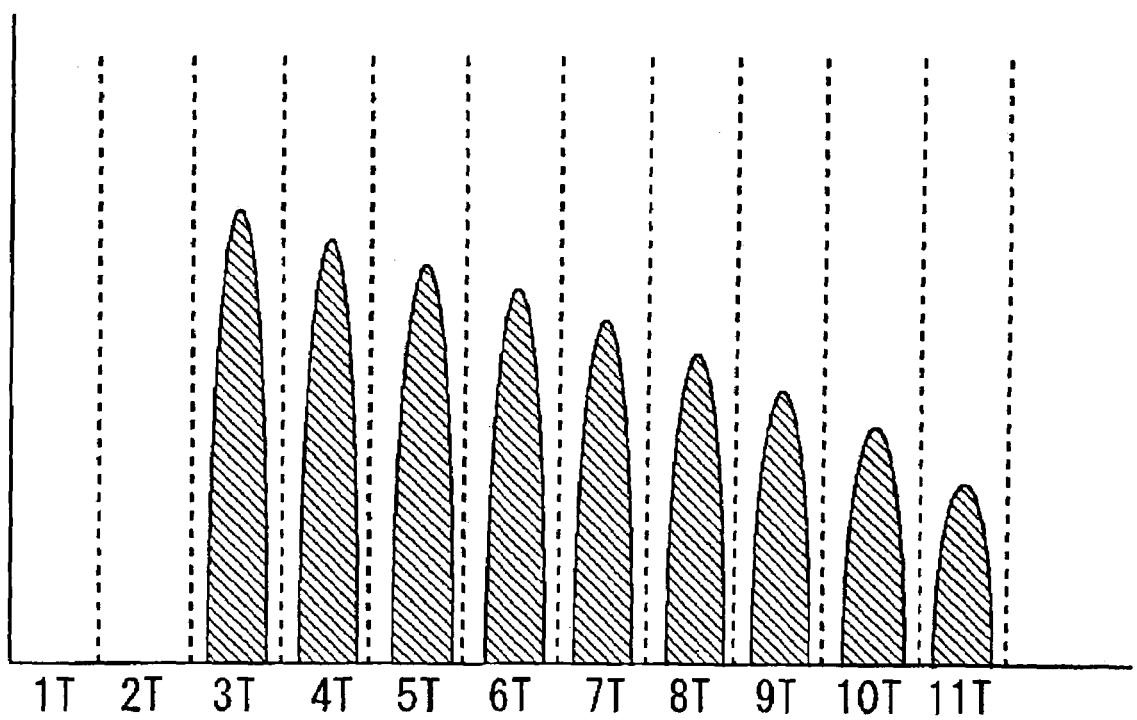
FIG. 8 shows an example of results of a statistical operation for measured data according to the first embodiment of the present invention.

For example, separately for the cases of the EFM signal being High and Low, the frequency of occurrence for each count value can be obtained through a statistical operation. With each address of the statistical data store area 7b being an area for storing the frequency of occurrence for a corresponding count value for pits or land areas, the control microcomputer 8 checks what count value each measured data in the measured data store area 7a is, and increments data in the address corresponding to the count value of the statistical data store area 7b. After performing this for all the measured data in the measured data store area 7a, data in each address of the statistical data store area 7b finally indicates the frequency of occurrence for the corresponding count value for pits or land areas. The host computer reads out results of the statistical operations from the statistical data store area 7b of the buffer RAM 7 via the control microcomputer 8, and has the results represented in a graph as shown in FIG. 8. From this graph, temporal variation in the played-back signal of the optical disk called jitter can be evaluated quantitatively.

Figure 9:
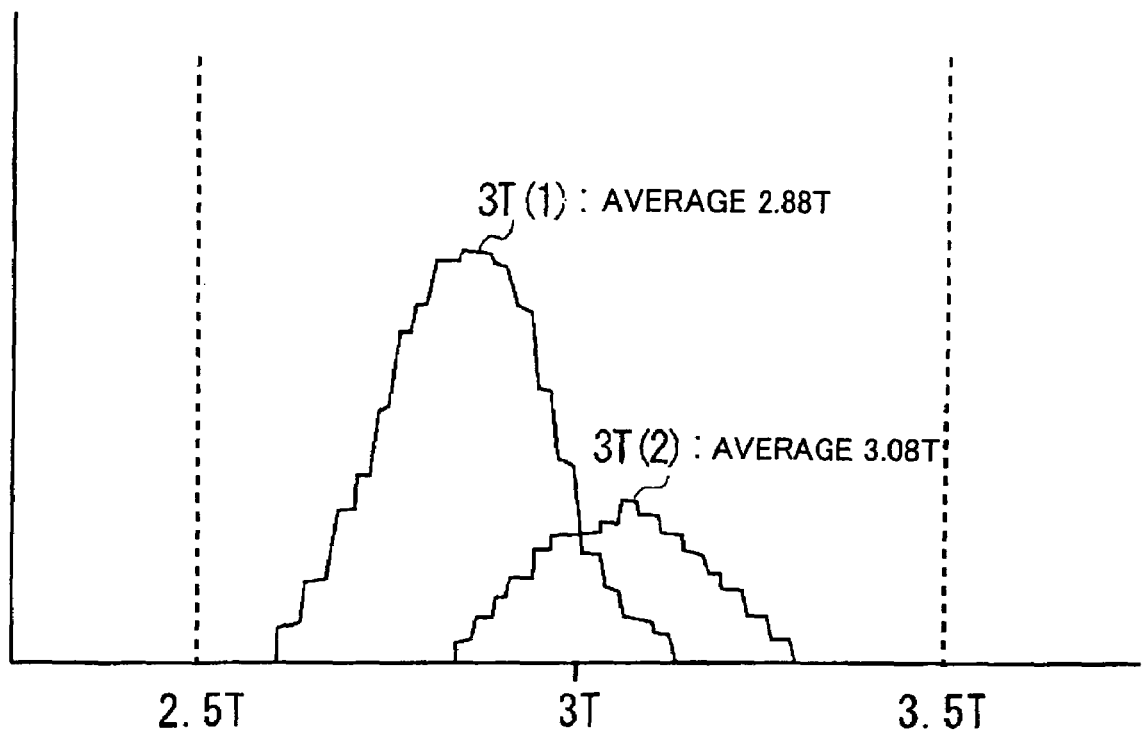
FIG. 9 shows an example of results of another statistical operation for measured data according to the first embodiment of the present invention.

Moreover, the evaluation of jitter with various conditions can be performed. For example, as shown in FIG. 9, in a statistical operation, in the first condition case of ones of the pits having a count value classified into 3T, the land area immediately before which corresponds to 4T in length and the land area immediately after which corresponds to 8T, the weighted average of the count values with the frequencies of occurrence as weights was 2.88T as indicated by 3T(1) of FIG. 9, and in the second condition case of ones of the pits having a count value classified into 3T, the land area immediately before which corresponds to 8T in length and the land area immediately after which corresponds to 4T, the weighted average of the count values with the frequencies of occurrence as weights was 3.08T as indicated by 3T(2). In this way, pits of the same 3T differ in jitter depending on conditions about the land areas before and after the pit.

Accordingly, when recording data on optical disk 2 by forming pits, in the first condition case, the timing of laser radiation for forming pits of 3T is delayed by 0.12T, and conversely, in the second condition case, the timing of laser radiation for forming pits of the same 3T is put ahead by 0.08T. By this means, overall jitter for 3T can be reduced quantitatively. By making adjustment for various condition cases likewise, jitter can be reduced. In particular, when recording data at high multiple speed on a recordable optical disk such as a CD-R/RW, jitter has a great effect on the quality of data recorded on the disk. Hence, predetermined data is recorded at high multiple speed on a recordable optical disk in advance, and by evaluating its record quality and then adjusting the timing of laser radiation for each condition case as described above, record of high quality becomes possible.

Furthermore, by evaluating jitter with the condition of the threshold in the binarizing circuit or the focus condition for the optical pickup being varied, data can be written on an optical disk in the optimum of these conditions.

Moreover, in a different jitter evaluation, by evaluating jitter at physical positions such as inner circumferences and outer circumferences or particular portions of an optical disk, it can be checked whether there is a problem with the optical disk itself. Further, according to the present invention, because measured data of the EFM signal can be written into the buffer RAM at high speed, by playing back not at single speed but at multiple speed, the jitter evaluation in playback at multiple speed is possible.

In the jitter evaluation, other statistical operations such as the calculation of an average or variance may be used not being limited to histogram.

Although in the present embodiment a CD recording/playback apparatus as an example of an optical disk recording/playback apparatus has been described, needless to say, the present invention is also effective in recording/playback apparatuses for optical disks of other types such as DVDS.

While the case of the CLV operation of constant linear velocity has been described, for the case of the CAV operation of constant angular velocity, optical disks can be evaluated correctly by correcting count values in a predetermined way. That is, because linear velocity is expressed as a product of angular velocity and the radius at the position of the pickup, in the case of the CAV operation, the count values written in the buffer RAM are corrected by multiplying them by the radius at the position of the pickup.

Furthermore, a PLL circuit that generates a clock signal synchronous with the bits of a digital signal read out from an optical disk may be made to generate a counter clock signal of high frequency, thereby obtaining the counter clock signal of high frequency dependent on the linear velocity. In the case of DVDS, a PLL circuit that generates a clock signal synchronous with a wobble signal or a LPP (Land Pre-Pit) signal may be made to generate a counter clock signal of high frequency.

Although the first embodiment of the present invention has been described, the first embodiment is provided to facilitate the understanding of the present invention and not intended to limit the present invention. It should be understood that various changes, substitutions and alterations can be made therein without departing from spirit and scope of the invention and that the present invention includes its equivalents. As embodiments other than the first embodiment, second and third embodiments of the present invention will be described below.

Second Embodiment

<Pre-format of DVD-R/RW Media>

Figure 10:
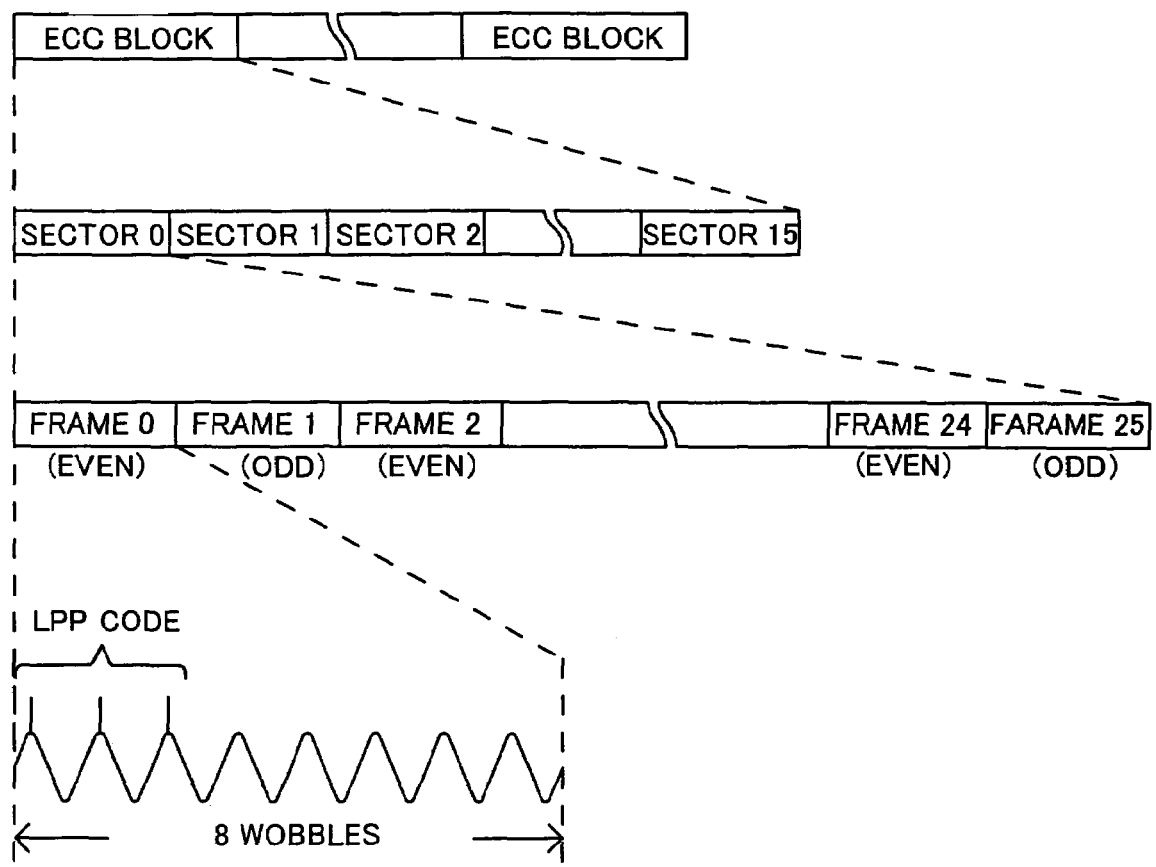
FIG. 10 is a view for explaining the pre-format of an optical disk according to an LPP scheme.

Groove wobble and LPP of the pre-format scheme of DVD-R/RW media will be described using FIG. 10.

DVD-R/RW media have groove tracks (recording grooves) that are a single track formed in a spiral and on which data is to be recorded and land tracks between adjacent groove tracks on which LPPS are already formed. The groove tracks are made to wobble at a fixed cycle. The frequency of the wobble (wobble frequency) is 140.6 KHz at standard speed of DVD-R/RW, and a clock signal corresponding in frequency to the length unit of marks is obtained by multiplying the wobble frequency by 186. That is, one cycle of the wobble signal is 186T when expressed in a unit of 1T, which equals 1/26.16 MHz at standard speed of DVD-R/RW.

Data to be recorded on groove tracks has a plurality of ECC (Error Correcting Code) blocks, which are error correction units. One ECC block comprises 16 sectors (sectors. 0 to 15), and each sector comprises 26 frames (frames 0 to 25).

Of 26 frames contained in one sector, even-numbered frames (frames 0, 2, . . . , 24) are called EVEN frames and odd-numbered frames (frames 1, 3, . . . , 25) are called ODD frames. At the peaks of the first three wobbles out of 8 wobbles for EVEN frames or ODD frames, an LPP code is disposed. On DVD-R/RW media, data is recorded synchronously in such a way as to arrange a data sync code contained in a frame to be coincident with the first bit of the LPP code.

Note that one sector contains 13 LPP codes and that the 13 LPP codes are decoded into an LPP sync code of one bit that is reference information for data recording position, and LPP information of 0.12 bits that is physical address information. Generated from the LPP sync code of one bit, a decoding result, can be various sync signals indicating the start of an ECC block, a sector, and a frame (a Block Sync Signal, a Sector Sync Signal, and Frame Sync Signals described later). And obtained from the LPP information of 12 bits, a decoding result, can be a block address, a sector address, and frame addresses.

<Pre-format of DVD+R/RW (Registered Trademark) Media>

Figure 11:
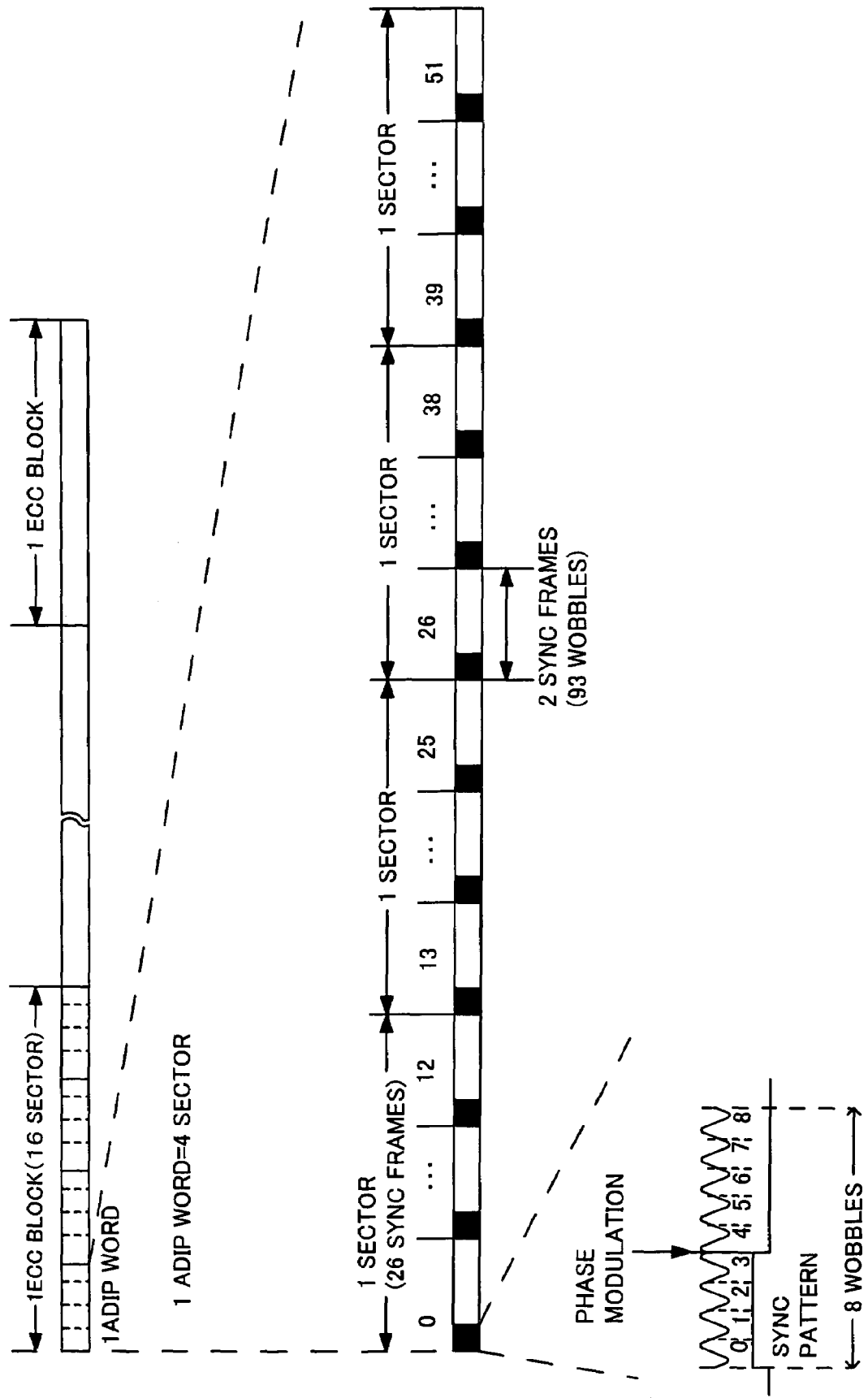
FIG. 11 is a view for explaining the pre-format of an optical disk according to an ADIP scheme.

ADIP (ADdress In Pre-groove) of the pre-format scheme of DVD+R/RW media will be described using FIG. 11. The ADIP scheme is a scheme wherein reference information for data recording position and physical address information are already recorded as a pattern obtained by modulating in phase the wobble frequency in groove tracks, instead of the use of LPPs for DVD-R/RW media.

On DVD+R/RW media, the groove tracks are made to wobble at a fixed cycle. One cycle of the wobble signal is 32T when expressed in a unit of 1T, which equals 1/26.16 MHz at standard speed of DVD+R/RW.

On DVD+R/RW media, there are a plurality of ECC blocks, which are error correction units. One ECC block comprises 16 sectors, and one sector comprises 26 sync frames. A sync code indicating the start of each two sync frames and one of ADIP bits indicating physical address information are contained as the phase-modulated pattern in the first 8 wobbles of 93 wobbles contained in the two sync frames.

Here, the sync codes will be described in detail. In the case where, for example, as shown in FIG. 11, the phase of the wobble signal changes by 180 degrees at between the 3rd and 4th cycles in the first sync frame of the first sector of one ECC block, a total of four wobbles, the 0th to the 3rd, are decoded into a sync code indicating the start of the sync frame. And generated from the decoding result, the sync code, can be various sync signals indicating the start of an ECC block, a sector, and frames (a Block Sync Signal, a Sector Sync Signal, and Frame Sync Signals described later). 13 ADIP bits are contained in one sector. Because one ECC block comprises 16 sectors, 208 ADIP bits are contained in one ECC block. 52 ADIP bits contained in four sectors form an ADIP word. And obtained from the result of decoding this ADIP word can be a block address, a sector address, and frame addresses.

<Configuration/Operation>

The configuration and operation of a DVD recording/playback apparatus 300 as an optical disk recording/playback apparatus according to the second embodiment of the present invention will be described using FIG. 12 with reference to the timing chart of FIG. 13 as needed.

In the second embodiment of the present invention, circuits that have the same functions as those in the first embodiment of the present invention are a pickup 301, a pickup controller 303, a binarizing circuit 304, a digital signal processing circuit 306, a buffer RAM 307, a control microcomputer 308, and a FIFO 313. Note that since an optical disk 302 is a DVD medium (DVD±R/RW, DVD-RAM, DVD-ROM, or the like), the CD-ROM decoder 6 of FIG. 1 is not necessary.

The digital signal processing circuit 306 has a decoder function for DVDs that performs 8-to-16 demodulation, descrambling, ECC block decoding and the like according to the DVD specification, and performing DVD-decoding on an EFMPlus signal (8-to-16 modulated signal) supplied from the binarizing circuit 304 thereby reproducing bit stream data such as MPEG video, audio, sub-picture, or the like. The buffer RAM 307 is buffer memory used in DVD-decoding by the digital signal processing circuit 306.

Next, the characteristic configuration and operation of the second embodiment of the present invention will be described.

The pickup 301 reads out pre-formatted information from the optical disk 302, a DVD medium, in parallel with reading out data represented by pits or marks recorded on groove tracks. For example, in the case of a DVD-R/RW, the wobble signal of grooves including the LPP information is read out, and in the case of a DVD+R/RW, the wobble signal of grooves including the ADIP information is read out.

The wobble signal including the LPP information or the ADIP information as pre-formatted information is supplied from the pickup 301 to an LPP/ADIP decoder 305. Then, a sync detector 311 detects sync codes contained in the wobble signal, and generates block sync signals indicating the start of respective ECC blocks and frame sync signals indicating the start of respective frames in response to sync codes and supplies them to a counter controller 314. FIGS. 13(A) and 13(B) show an example of block and frame sync signals supplied from the LPP/ADIP decoder 305 to the counter controller 314.

The LPP/ADIP decoder 305 decodes into sector/frame addresses, which are physical addresses on the optical disk 302, by performing LPP/ADIP decoding on the wobble signal supplied from the pickup 301, stores them in a sector/frame address register 310, and supplies them to the counter controller 31 synchronously with the above-mentioned block and frame sync signals. FIGS. 13(C) and 13(D) show an example of sector/frame addresses, which are sequentially supplied from the LPP/ADIP decoder 305, to the counter controller 314 synchronously with falling edges of the block and frame sync signals. The sector/frame addresses stored in the sector/frame address register 310 may be read out by the control microcomputer 308 through interrupt or polling.

The counter controller 314 controls the start/end of counting for the EFMPlus signal supplied from the binarizing circuit 304 on the basis of the block and frame sync signals and sector/frame addresses supplied from the LPP/ADIP decoder 305 and of count start and end addresses supplied from the control microcomputer 308. That is, the counter controller 314 is a control circuit that makes a counter 312 count during each clock period of the EFMPlus signal read out from a given division area on the optical disk 302 identified by sector/frame addresses (and a block address) decoded into in the LPP/ADIP decoder 305, and further, synchronizes the count operation in the counter 312 with the clock periods of the EFMPlus signal to count during that are identified by sector/frame addresses on the basis of the block and frame sync signals supplied from the LPP/ADIP decoder 305.

To explain specifically, the control microcomputer 308 supplies the counter controller 314 beforehand with sector/frame addresses (a count start address) at which the count in the counter 312 starts and sector/frame addresses (a count end address) at which the count in the counter 312 ends. The count start address is stored in a start address store register 315 and the count end address in an end address store register 316.

The control microcomputer 308 supplies the counter controller 314 with a sampling trigger signal before the block sync signal of a target ECC block to count for is produced, thereby changing the counter controller 314 from being in a sleep state to being in an active state. FIG. 13(E) is an example of the sampling trigger signal. Until a sampling trigger signal is supplied from the control microcomputer 308, counter controller 314 is in the sleep state, thereby contributing to the reduction of power consumption.

In the case where the counter controller 314 is in the active state due to the sampling trigger signal, first, a switch 317 is switched to select the start address store register 315, and having received a block sync signal associated with a target ECC block and a frame sync signal associated with the first frame of the first sector of the ECC block from the LPP/ADIP decoder 305, a comparator 318 compares the sector/frame addresses sequentially supplied from the LPP/ADIP decoder 305 with the count start address stored in the start address store register 315.

When the comparing result in the comparator 318 indicates matching, the counter controller 314 asserts a sampling enable signal, which enables the counter 312 to count and is a signal to switch between counter clocks being valid and invalid in the counter 312. That is, until the counter controller 314 asserts the sampling enable signal, counter clocks are invalid, and hence, the counter 312 does not count thereby contributing to the reduction of power consumption.

FIG. 13(F) is an example of the sampling enable signal. When a target sector/frame is sector 0/frame 1, in response to the falling edge of the frame sync signal indicating the start of sector 0/frame 1, the sampling enable signal is asserted (changing from the L level to the H level). By the sampling enable signal being asserted, counter clocks to the counter 312 become valid as shown in FIG. 13(G), and thus, the counter 312 starts to count during the clock periods of the EFMPlus signal. Temporarily storing the count values in the FIFO 313 and writing the count values into the buffer RAM 307 in batches are performed in the same way as in the first embodiment.

Moreover, after asserting the sampling enable signal, the counter controller 314 switches the switch 317 to select the end address store register 316. Then, the comparator 318 compares the sector/frame addresses sequentially supplied from the LPP/ADIP decoder 305 with the count end address stored in the end address store register 316. When the comparing result in the comparator 318 indicates matching, the counter controller 314 negates the sampling enable signal. Thus, the counter clocks to the counter 312 become invalid again, and the counter 312 stops counting.

Other Embodiments

<<Control of Writing into the Buffer RAM>>

While, in the second embodiment described above, the counter 312 is made to start/stop counting by using the sampling enable signal, the method may be adopted wherein the counter continues to count with the counter clocks always running, while the writing of count values into the buffer RAM 307 is made to start by asserting the sampling enable signal and to end by negating the sampling enable signal.

Note that this case is substantially equivalent to the case where the count in the counter 312 is controlled by the sampling enable signal supplied from the counter controller 314 as in the second embodiment. In the present invention, the control of count operation of the counter 312 by the counter controller 314 includes the control of the start and end of writing count values into the buffer RAM 307 as described above.

<<Count Control by the Block Sync Signal>>

It can be easily implemented by existing firmware or the like that, when receiving an instruction to play back the optical disk 302 from the host computer, the optical disk recording/playback apparatus moves the optical pickup 301 to the ECC block area on the optical disk 302 corresponding to the ECC block preceding to an ECC block to be played back, because an ECC block area is wider than a sector area or a frame area.

Hence, in the second embodiment, when evaluating jitter on an ECC block unit basis, the optical disk recording/playback apparatus may detect the block sync signal indicating the start of an ECC block to be evaluated in terms of jitter and make the counter 312 start counting in response to the block sync signal. In this case, because the obtaining of the block address is not needed, the optical disk recording/playback apparatus need not be provided with the sector/frame address register 310 shown in FIG. 12, and moreover, the LPP/ADIP decoder 305 shown in FIG. 12 is configured to receive a signal decoded in the digital signal processing circuit 306 instead of a signal from the optical pickup 301.

<<CD Recording/Playback Apparatus>>

While in the second embodiment the DVD recording/playback apparatus has been described, needless to say, the invention can be embodied as a CD recording/playback apparatus. In this case, the configuration of the DVD recording/playback apparatus 300 of FIG. 12 needs to be replaced with that of the CD recording/playback apparatus as shown in FIG. 1. For example, the LPP/ADIP decoder 305 is replaced with an ATIP (Absolute Time In Pre-groove) decoder (not shown).

Figure 14:
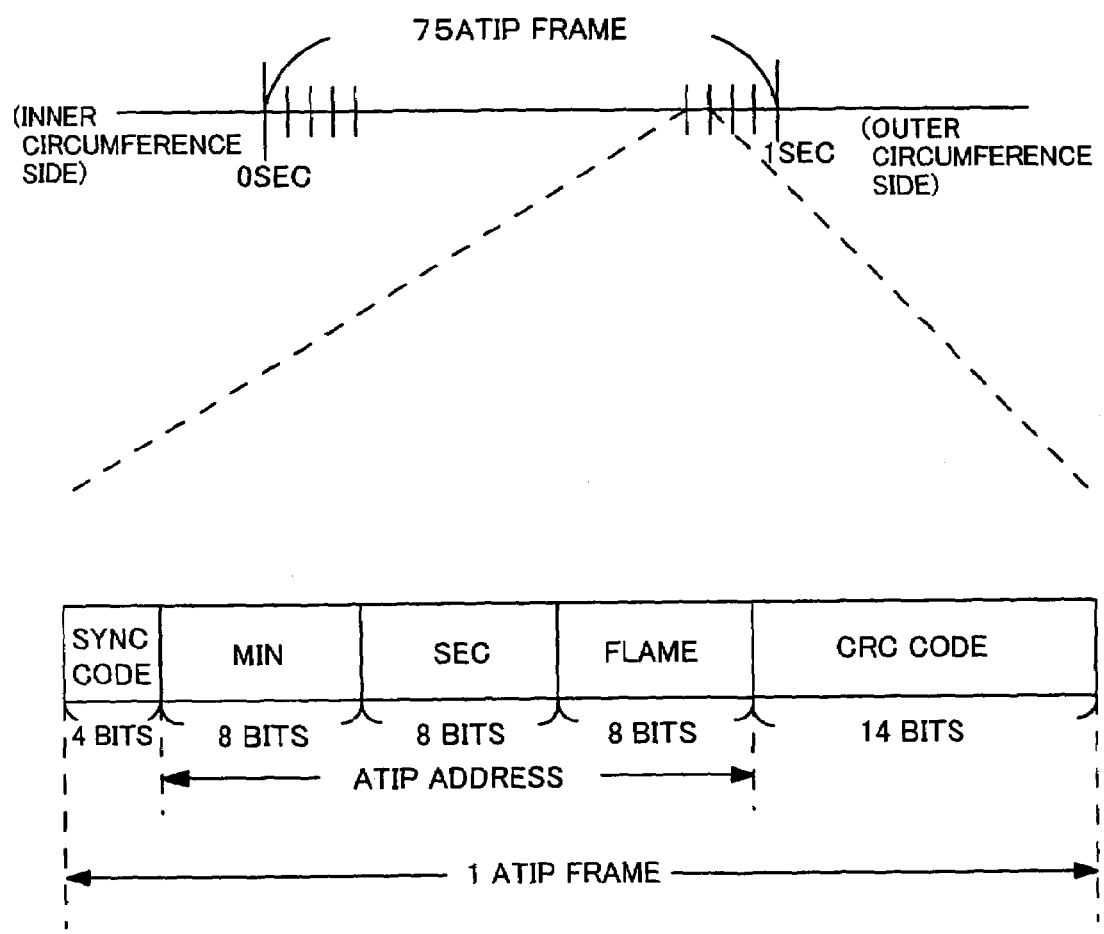
FIG. 14 is a view for explaining the pre-format of an optical disk according to an ATIP scheme.

The ATIP presents addresses as absolute time information pre-formatted on groove tracks of CD media. One ATIP frame corresponding to 1/75 sec, as shown in FIG. 14, comprises 42 bits as follows. The first 4 bits are a sync code indicating the start of the one ATIP frame, whereby the optical disk recording/playback apparatus recognizes the start of the one ATIP frame when playing back the ATIP frame; the next 24 bits, the 5th through 28th bits, indicate the ATIP address of the one ATIP frame composed of Minute, Second, and Frame fields, and the 29th through 42nd bits, 14 bits, are a CRC (Cyclic Redundancy Code) code.

In the CD recording/playback apparatus as the second embodiment, an ATIP decoder detects the sync code of each ATIP frame from the wobble signal including ATIP information supplied from the pickup, produces a sync signal indicating that the sync code has been detected, and decodes into the ATIP address. And the counter controller controls the counter to count during clock periods of the EFM signal from the given division area on the optical disk identified by the ATIP address decoded into in the ATIP decoder.

<<Sync Code recorded in the Form of Pit/Mark Data>>

In the second embodiment, the method wherein information about position on the optical disk 302 is obtained from pit data or mark data recorded on the optical disk 302 may be adopted other than the use of pre-formatted information (LPP information, ADIP information, or wobble information) already set physically on the optical disk 302.

Figure 15:
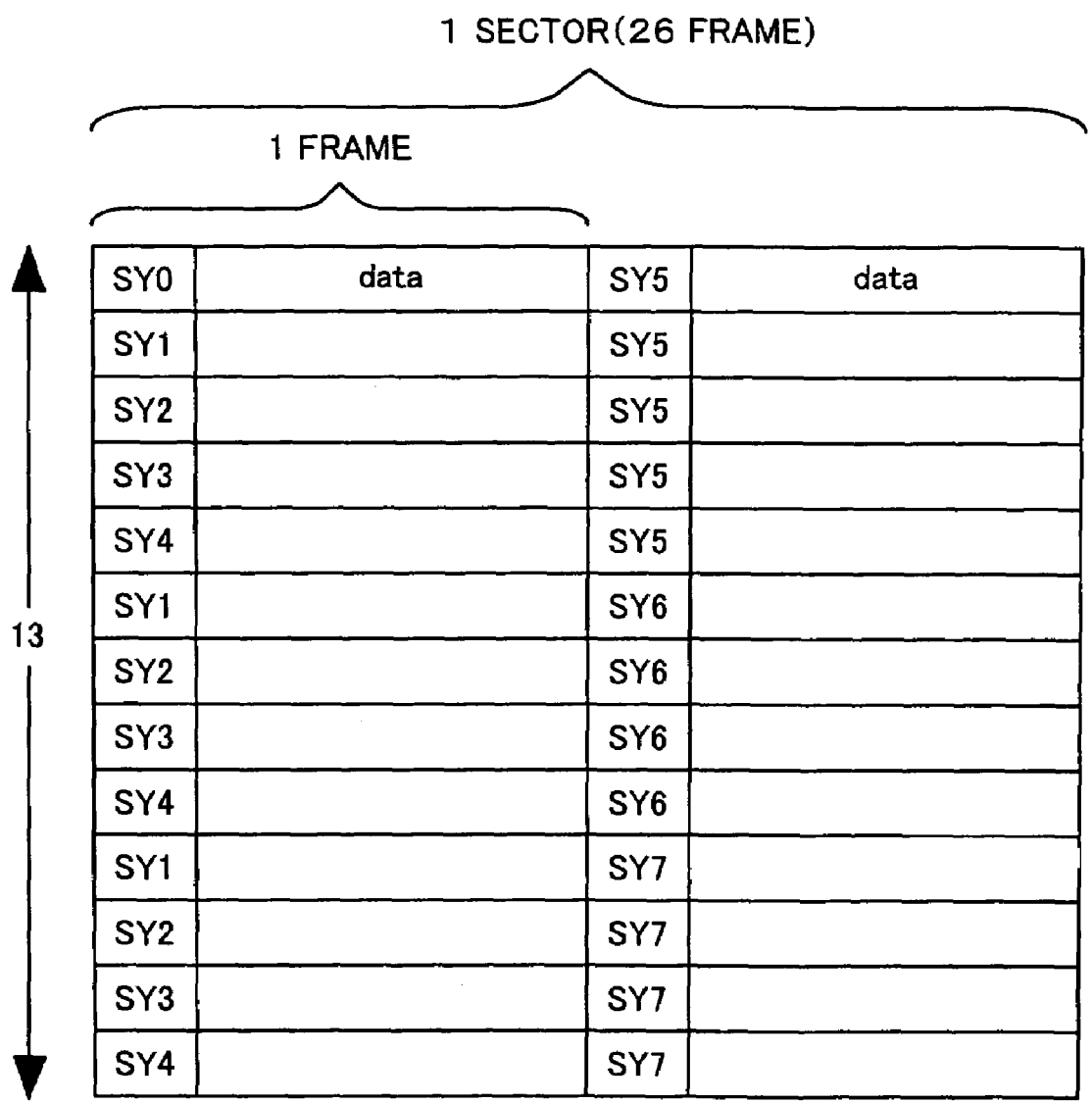
FIG. 15 is a view for explaining the data format of one sector according to a DVD specification.

For example, in DVD specifications such as that for DVD-ROMs, one ECC block has 16 sectors, and each sector includes header information indicating its address and has 26 frames as shown in FIG. 15. One of sync codes SY0 to SY7 is recorded in the form of pits or marks in the head of each frame according to its position in the order of the frames. Hence, the optical disk recording/playback apparatus may detect sector and frame addresses by detecting the appearance order of these sync codes SY0 to SY7, without relying on the pre-formatted information already set physically on the optical disk 302.

<Exemplary Effect>

As described above, according to the second embodiment, jitter can be evaluated for clock periods of the EFM/EFMPlus signal from a given division area on the optical disk identified on the basis of address information obtained from the pre-formatted information of an optical disk, and hence, the reliability of the jitter evaluation can be improved. Furthermore, according to the second embodiment, the count operation in the counter 312 and the identifying of clock periods to evaluate jitter for can be synchronized on the basis of address information and sync codes obtained from the pre-formatted information of the optical disk. Note that this synchronization is performed independently of the control microcomputer 308, which performs asynchronous control (interrupt/polling) with respect to the LPP/ADIP decoder 305 and the counter controller 314. That is, according to the second embodiment, not relying on the control microcomputer, the identifying of clock periods to evaluate jitter for and the count operation in the counter can be synchronized highly accurately, and thus, the reliability of the jitter evaluation can be further improved.

Third Embodiment

<Pre-format of DVD-RAM/ROM Media>

Figure 16:
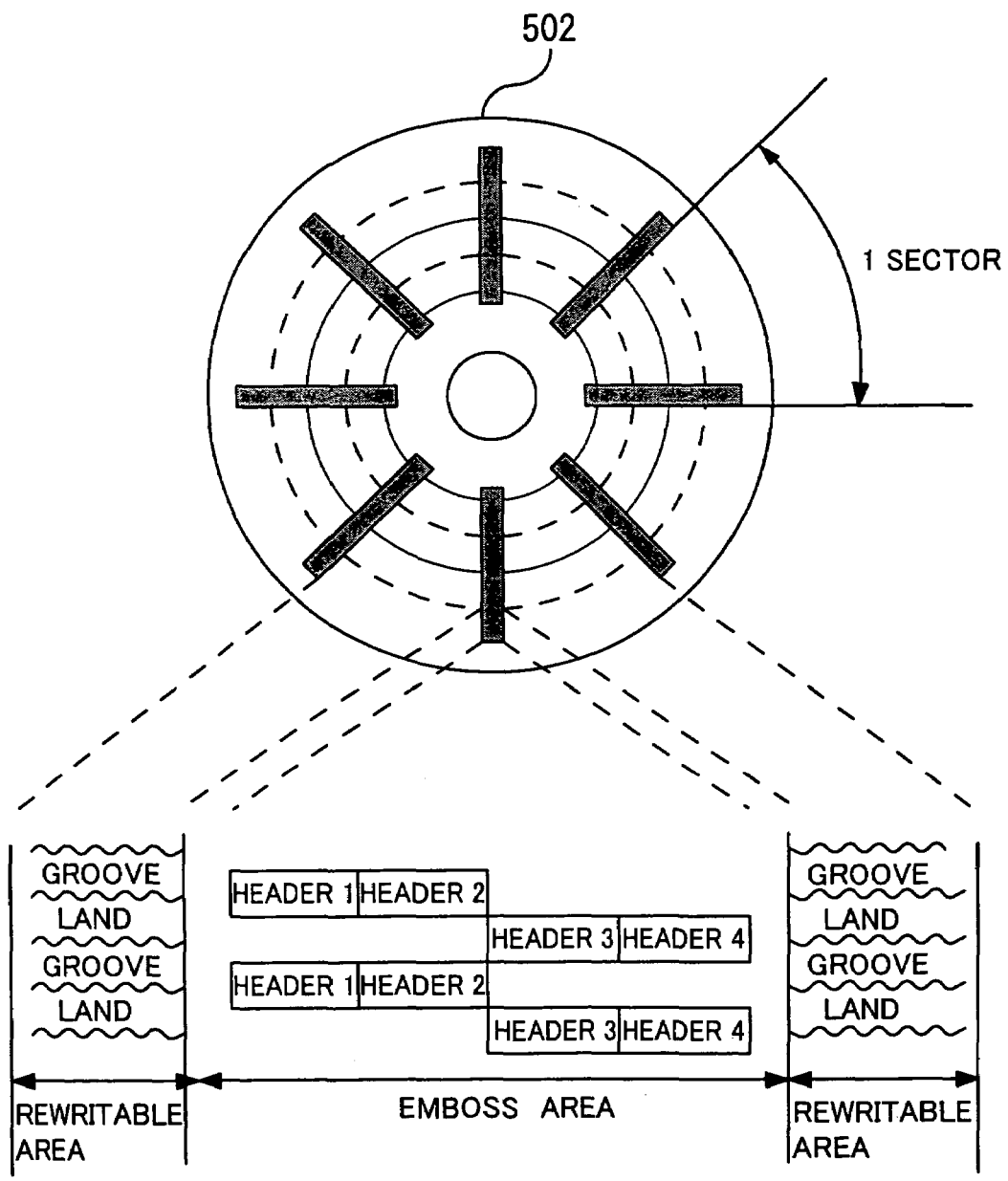
FIG. 16 is a view for explaining the pre-format of an optical disk according to a CAPA scheme.

As shown in FIG. 16, on DVD-RAM/ROM media there are arranged alternately ReWritable areas where information of the user can be rewritten and Emboss areas where header information such as physical addresses on the medium is recorded in the form of Embossed Pits. ReWritable areas, which are land tracks or groove tracks, are made to wobble at a fixed cycle. By measuring these wobble cycles, the start position of the next Emboss area can be found.

The Embossed Pits are recorded on a sector unit basis according to a scheme called CAPA (Complimentary Allocated Pit Addressing). The CAPA scheme is a scheme wherein Embossed-Pits are recorded offset by one half track from a land track or a groove track which is a recording track. When tracking grooves, addresses are obtained from one half side of Embossed-Pits information (headers 1, 2) and when tracking lands, addresses are obtained from the other half side of Embossed-Pits information (headers 3, 4).

<Configuration/Operation>

Figure 17:
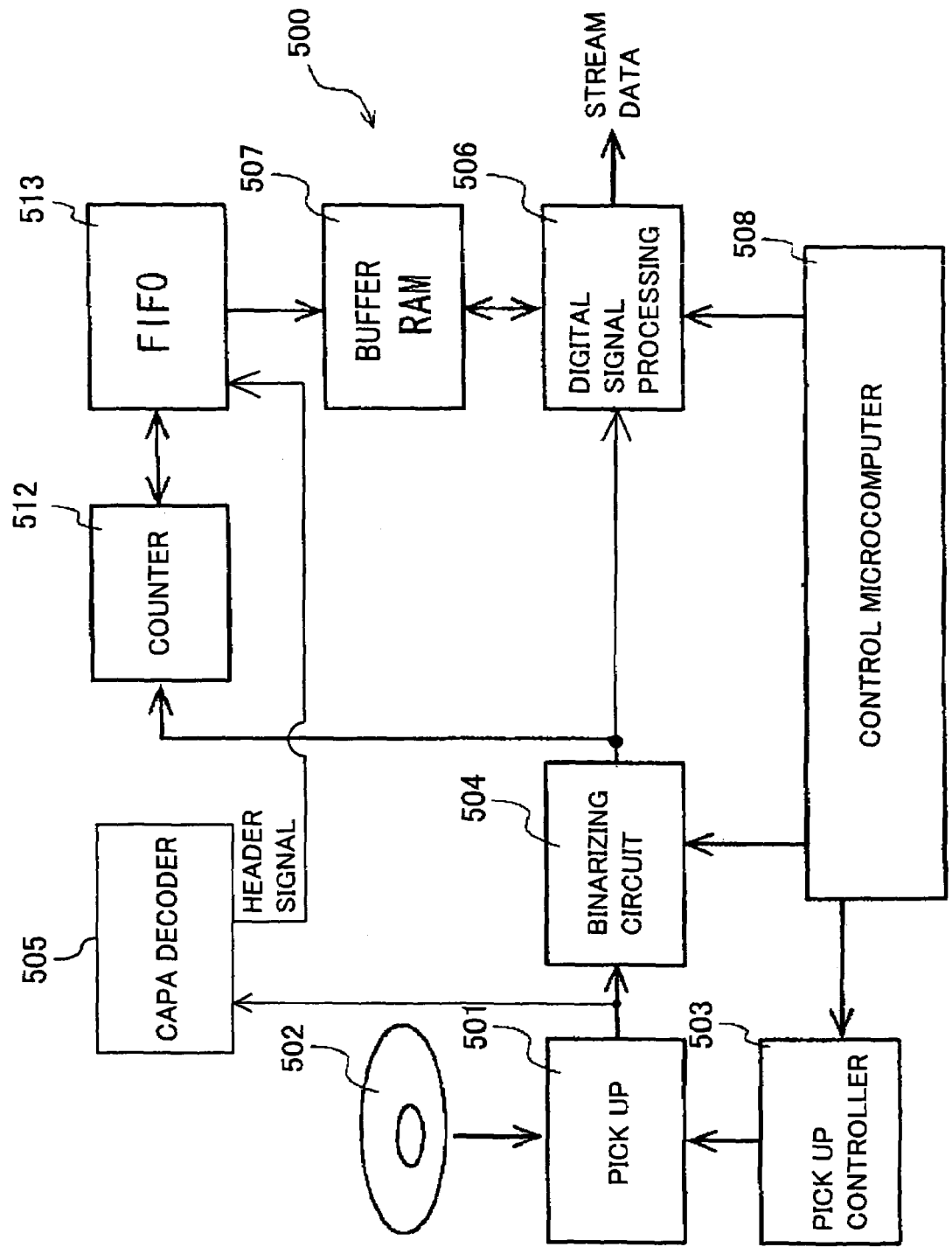
FIG. 17 is a block diagram showing a third embodiment of an optical disk recording/playback apparatus according to the present invention.

The configuration and operation of a DVD recording/playback apparatus 500 as an optical disk recording/playback apparatus according to the third embodiment of the present invention will be described using FIG. 17 with reference to the timing chart of FIG. 18 as needed.

Figure 12:
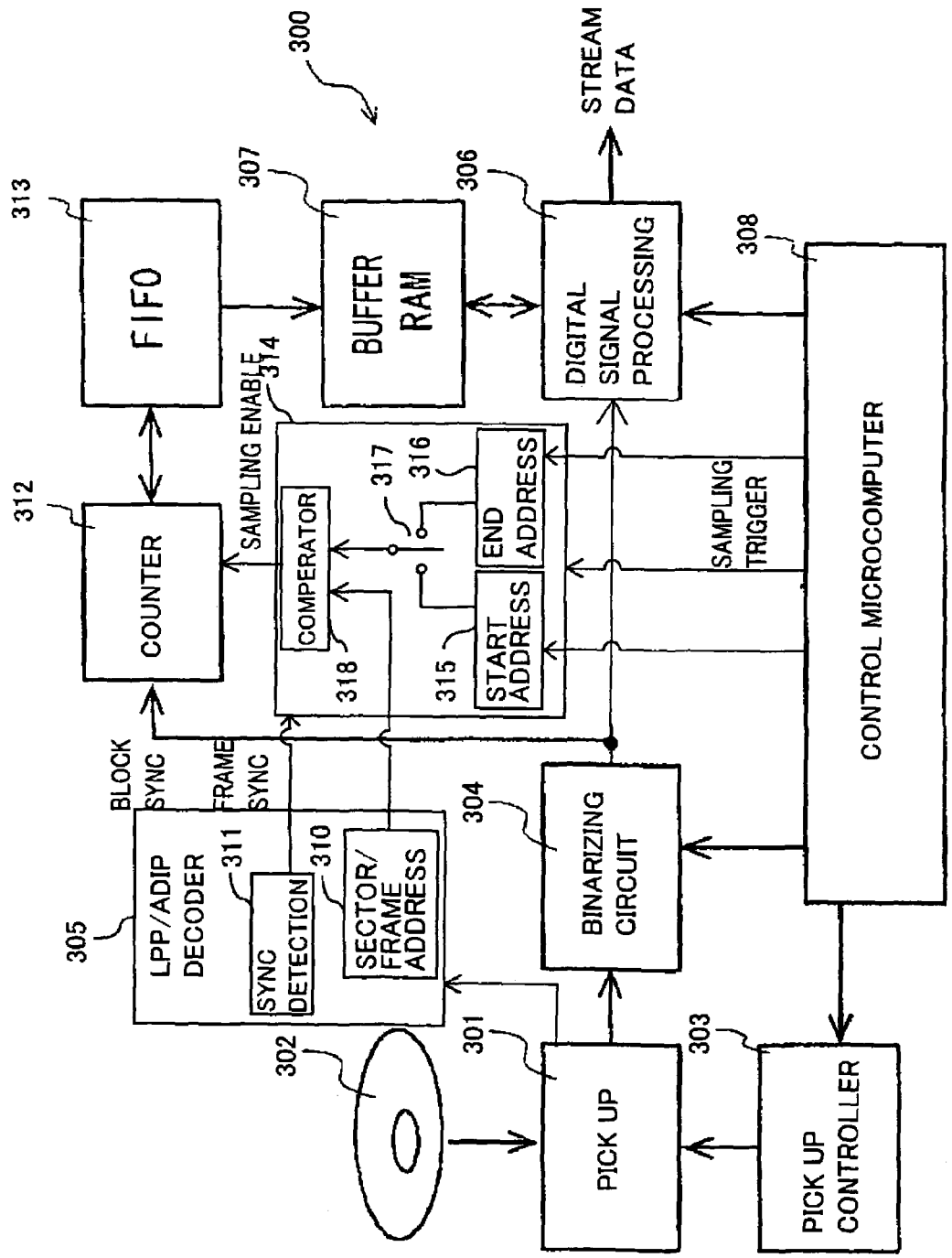
FIG. 12 is a block diagram showing a second embodiment of an optical disk recording/playback apparatus according to the present invention.
Figure 13:
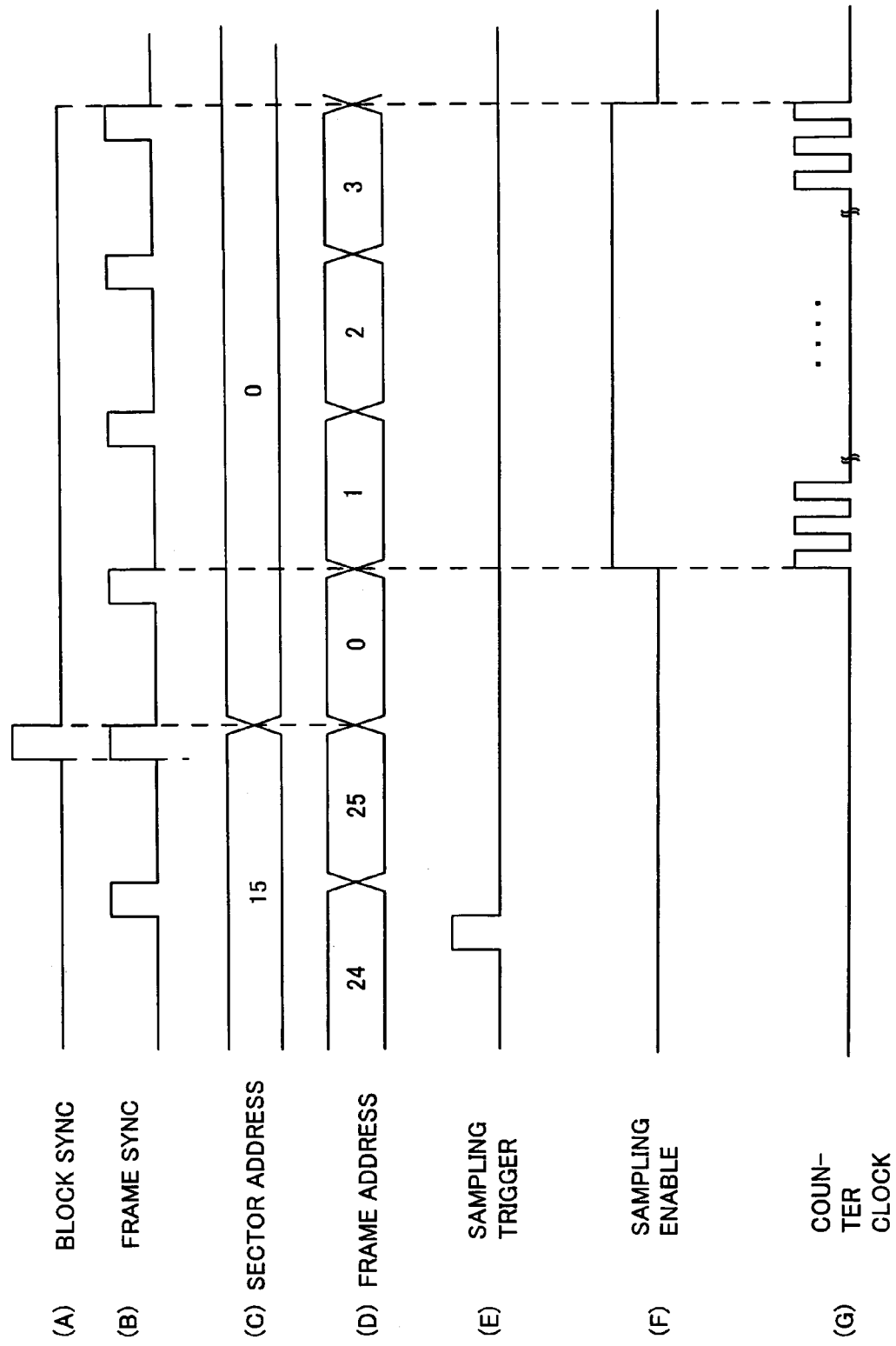
FIG. 13 is a view for explaining the operation of setting a measured data sampling period according to the second embodiment of the present invention.

In the third embodiment of the present invention, circuits that have the same functions as those in the first and second embodiments of the present invention shown in FIGS. 1 and 12 are a pickup 501, a pickup controller 503, a binarizing circuit 504, a digital signal processing circuit 506, a buffer RAM 507, a control microcomputer 508, and a counter 512. Note that since an optical disk 502 is a DVD-RAM/ROM medium, the CD-ROM decoder 6 of FIG. 1 is not necessary.

As in the second embodiment of the present invention, the digital signal processing circuit 506 performs DVD-decoding on the EFMPlus signal (8-to-16 modulated signal) supplied from the binarizing circuit 504 thereby reproducing bit stream data such as MPEG video, audio, sub-picture, or the like. In this case, the buffer RAM 507 is buffer memory used in DVD-decoding by the digital signal processing circuit 506.

Next, the characteristic configuration and operation of the third embodiment of the present invention will be described.

The pickup 501 reads out data represented by pits or marks recorded on groove tracks from the optical disk 502, a DVD-RAM medium, and at this time because Embossed-Pits according to the CAPA scheme are already recorded as pre-formatted information in Emboss areas on the optical disk 502, the data read out from the optical disk 502 includes Embossed-Pits information.

In the Emboss areas, Embossed-Pits are recorded offset by one half track from a groove/land track of the ReWritable area. Hence, in order to improve the reliability of the jitter evaluation, jitter needs to be evaluated separately for the Emboss areas and for the ReWritable areas. Accordingly, in the third embodiment of the present invention, a CAPA decoder 505 is provided as a new component.

The CAPA decoder 505 determines whether data read out by the pickup 501 from the optical disk 502 and thus the EFMPlus signal to count for, supplied from the binarizing circuit 504 to the counter 512, is Embossed-Pits information from an Emboss area or information of the user from a Rewritable area. When determining that the EFMPlus signal indicates Embossed-Pits information, the CAPA decoder 505 generates a header signal for indicating that the count value of the counter 512 is a count value for an Emboss area and supplies to FIFO 513.

Figure 18:
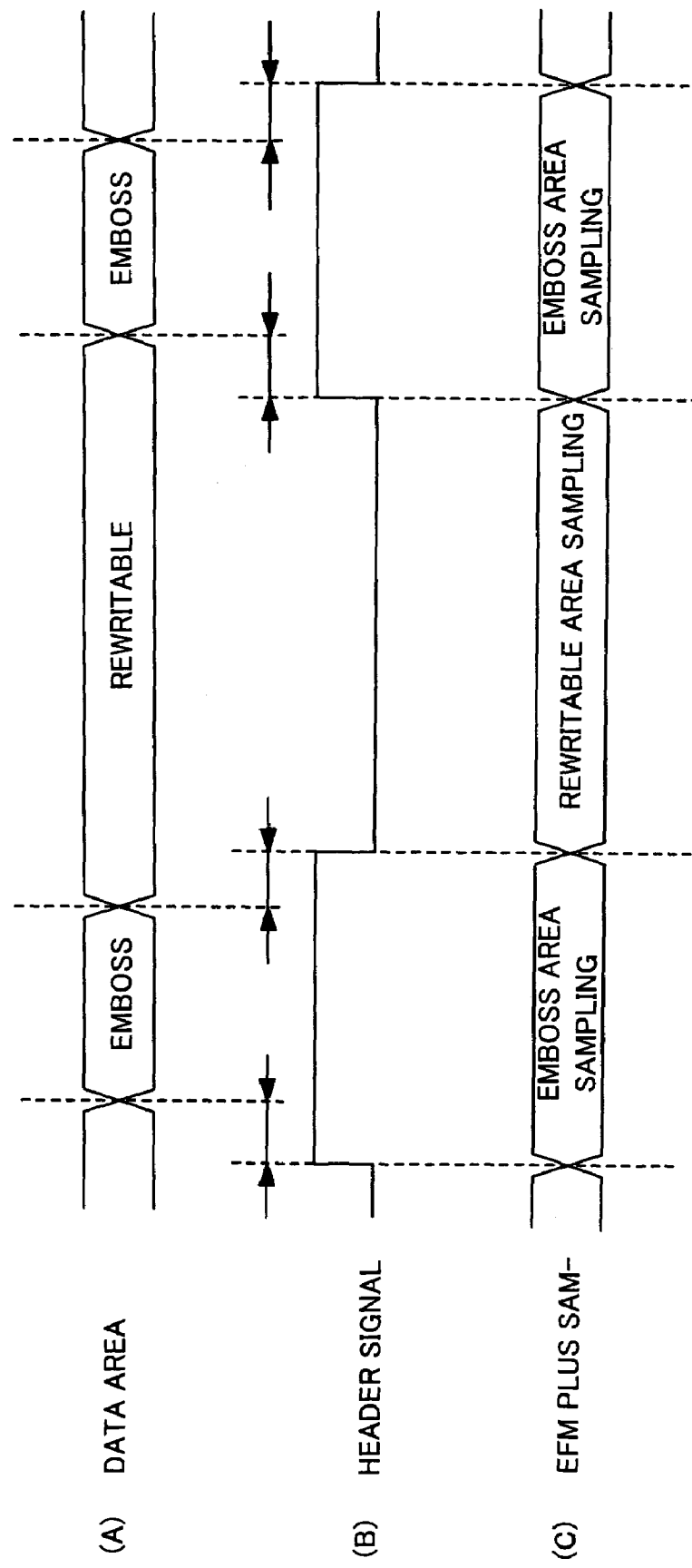
FIG. 18 is a view for explaining the operation of setting a measured data sampling period according to the third embodiment of the present invention.

FIG. 18 shows an example of the header signal. The header signal shown in FIG. 18 being high corresponds to Embossed-Pits information from Emboss areas and, in addition, the user's information from parts of ReWritable areas around the boundaries because data indicating whether to be Embossed-Pits information or the user's information determined in the CAPA decoder 505 may not be synchronous with data for the counter 512 to count for.

As in the first and second embodiments of the present invention, the FIFO 513 temporarily stores the count values sequentially transferred from the counter 512 and writes a predetermined number of count values temporarily stored into a measured data store area 7a of the buffer RAM 507 in a batch. Note that while the header signal from the CAPA decoder 505 is high, the FIFO 513 recognizes that the count values being sequentially transferred from the counter 512 to be temporarily stored are count values for an Emboss area. At this time, the FIFO 513 adds a code indicating being a count value for an Emboss area (CAPA ERROR described later) to the predetermined number of count values temporarily stored, and writes into the measured data store area 7a of the buffer RAM 507 in a batch.

Figure 19:
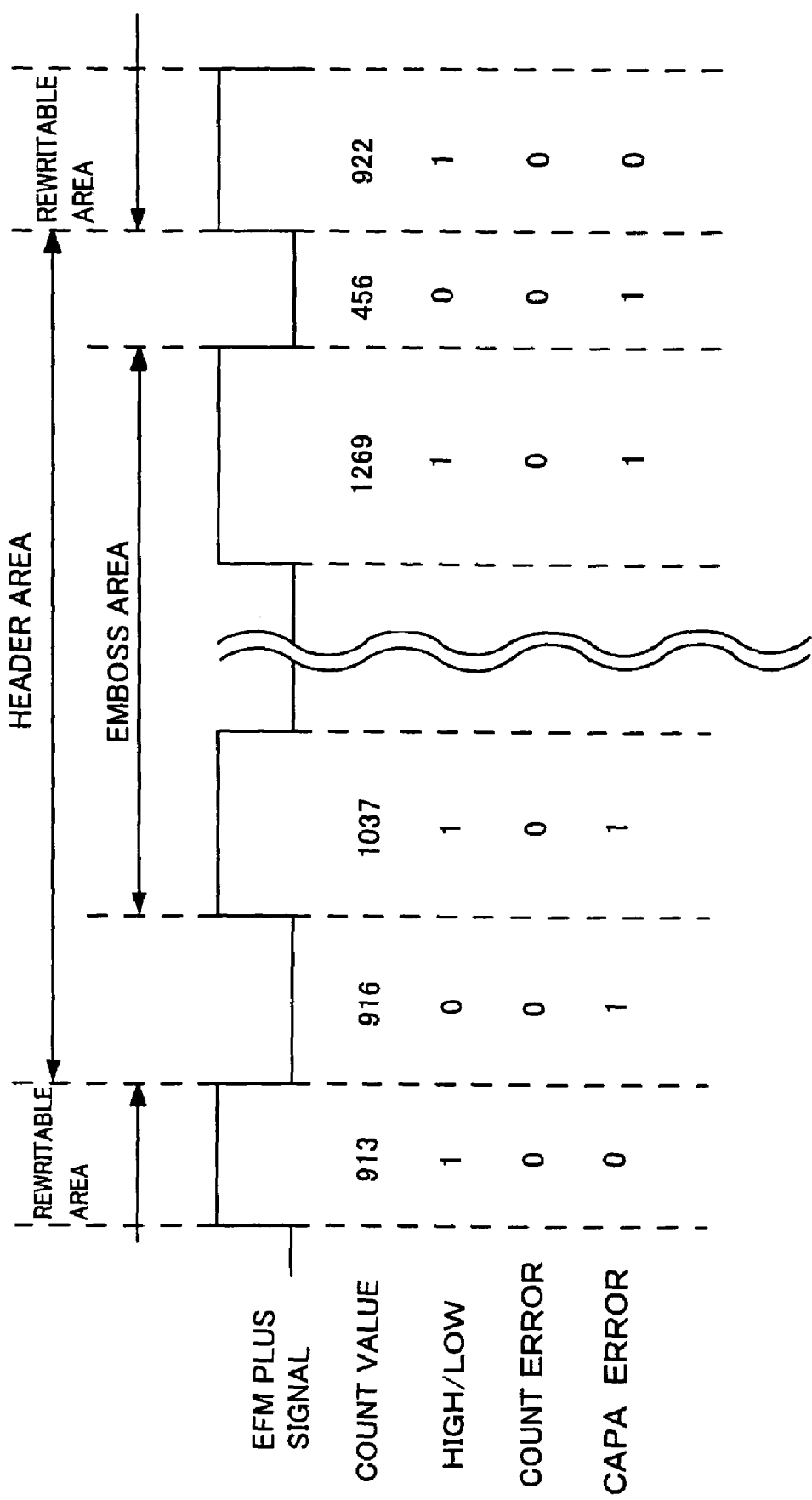
FIG. 19 shows an example of measured data according to the third embodiment of the present invention.

FIG. 19 shows an example of data to be written into the buffer RAM 507 according to the third embodiment of the present invention. As in the example of FIG. 5, the "count value" is a value obtained by the counter 512 counting during a clock period of the EFMPlus signal, and the "High/Low" is the polarity data of the clock period. The "count ERROR" is an error code for the control microcomputer 508 to recognize whether the transfer of measured data from the counter 512 to the FIFO 513 is normally finished, and is at 0 when normal and at 1 when anomalous, for example.

The CAPA ERROR is an error code for the control microcomputer 508 to recognize whether or not the EFMPlus clock period during which the counter 512 has counted is in the time period corresponding to an Emboss area, and is, for example, at 1 if the header signal generated in the CAPA decoder 505 is high in the EFMPlus clock period and at 0 otherwise, the header signal being high during a time period including the time period corresponding to the Emboss area.

Other Embodiments

In the third embodiment, areas other than the areas of an optical disk where information of the user is recorded (e.g., ReWritable areas) are not limited to the Emboss areas of DVD-RAM media, but need only be particular areas where specific data like the Embossed-Pits, which are recorded offset by one half track from a groove/land track, is recorded according to a particular optical disk specification.

In the third embodiment, if jitter is not evaluated for the Emboss areas, when the CAPA decoder 505 has determined that it is Embossed-Pits information, the counter clocks being supplied to the counter 512 may be made invalid thereby stopping the counter 512.

<Exemplary Effect>

After finishing the writing of various data into the buffer RAM 507, the control microcomputer 508 evaluates jitter by analyzing the count values written in the buffer RAM 507, where CAPA ERRORs are written associated with count values. Thus, the control microcomputer 508 can perform the jitter evaluation for Emboss areas and for ReWritable areas separately on the basis of the CAPA ERRORs written in the buffer RAM 507. Thus, according to the third embodiment of the present invention, the reliability of the jitter evaluation can be further improved.

Although the preferred embodiment of the present invention has been described in detail, the above embodiment is provided to facilitate the understanding of the present invention and not intended to limit the present invention. It should be understood that various changes, substitutions and alterations can be made therein without departing from spirit and scope of the invention and that the present invention includes its equivalents.

What is claimed is:

1. An optical disk recording/playback apparatus which illuminates an optical disk with laser light, receives the laser light modulated by pits or marks recorded on the optical disk, and converts the light amount of the received laser light into an electrical signal, thereby obtaining a reproduced signal and evaluating the optical disk, comprising:

a counter that counts counter clocks of high frequency during periods of a series of binary values produced from the reproduced signal by a binarizing circuit; and a temporary memory that temporarily stores a plurality of count values of the counter and transfers the plurality of count values stored to a measured data store area of a buffer RAM in a batch.

2. The optical disk recording/playback apparatus according to claim 1, wherein the counter detects a polarity of each period of the series of binary values produced from the reproduced signal to produce polarity data, and wherein the temporary memory temporarily stores count values and their respective polarity data detected by the counter so as to be associated with each other and transfers the count values and the respective polarity data stored to the measured data store area of the buffer RAM in a batch.

3. The optical disk recording/playback apparatus according to claim 1, wherein when an error occurs in transferring data to and/or from the counter, the temporary memory associates data of the error with a corresponding count value detected by the counter and transfers the error data as well to the measured data store area of the buffer RAM.

4. The optical disk recording/playback apparatus according to claim 1, further comprising:

an address decoder that detects synchronization codes added to each address data indicating a position on the optical disk on the basis of the reproduced signal from the optical disk; and a counter controller that enables the counter to count during the periods corresponding to a desired division area on the optical disk on the basis of the detected synchronization codes.

5. The optical disk recording/playback apparatus according to claim 1, further comprising:
an address decoder that decodes each address data indicating a position on the optical disk on the basis of the reproduced signal from the optical disk; and
a counter controller that enables the counter to count during the periods corresponding to a desired division area on the optical disk identified by a corresponding one of the decoded address data.

6. The optical disk recording/playback apparatus according to claim 5, wherein the address decoder detects synchronization codes added to the address data in parallel with decoding the address data, and
wherein the counter controller synchronizes identifying of periods by the address data with the count of the counter on the basis of the detected synchronization codes.

7. The optical disk recording/playback apparatus according to claim 1, further comprising:
a determining circuit that determines whether a count value of the counter is a count value obtained by counting during one of the periods corresponding to particular areas defined by a specification for the optical disk,
wherein, when it is determined that a count value of the counter is a count value obtained by counting during one of the periods corresponding to the particular areas, the temporary memory associates a code to that effect with the count value detected by the counter, and transfers the code and the count value to the measured data store area of the buffer RAM.

8. The optical disk recording/playback apparatus according to claim 7, wherein the particular areas are areas where header information according to a CAPA (Complimentary Allocated Pit Addressing) scheme is recorded.

9. An optical disk evaluation method to illuminate an optical disk with laser light, receive the laser light modulated by pits or marks recorded on the optical disk, and convert the light amount of the received laser light into an electrical signal, thereby obtaining a reproduced signal and evaluating the optical disk, comprising:
counting, by a counter, counter clocks of high frequency during periods of a series of binary values produced from the reproduced signal by a binarizing means; and
temporarily storing a plurality of count values of the counter in a temporary memory and transferring the plurality of count values stored to a measured data store area of a buffer RAM in a batch.

10. The optical disk evaluation method according to claim 9, wherein the counter detects polarity data of each period of the series of binary values produced from the reproduced signal, and
wherein the temporary memory temporarily stores count values and their respective polarity data detected by the counter so as to be associated with each other and transfers the count values and the respective polarity data stored to the measured data store area of the buffer RAM in a batch.

11. The optical disk evaluation method according to claim 10, further comprising:
reading out sequentially the count values and the polarity data stored in the buffer RAM;
performing a statistical operation to obtain a characteristic of periods of the series of binary values produced from the reproduced signal; and
writing intermediate results of the statistical operation into a statistical data store area of the buffer RAM sequentially.

12. The optical disk evaluation method according to claim 11, wherein the statistical operation includes one of histogram, average calculation, and variance calculation for the count values of periods, corresponding to pits or land areas, of the series of binary values produced from the reproduced signal.

13. The optical disk evaluation method according to claim 12, wherein the statistical operation has conditions of periods corresponding to land areas or pits before and after given pits or land areas of the series of binary values produced from the reproduced signal.

* * * * *